US011862110B2

(12) United States Patent
Moon et al.

(10) Patent No.: US 11,862,110 B2
(45) Date of Patent: Jan. 2, 2024

(54) DATA DRIVER, ELECTROLUMINESCENT DISPLAY APPARATUS, AND DRIVING METHOD THEREOF

(71) Applicant: LG Display Co., Ltd., Seoul (KR)

(72) Inventors: Myung Kook Moon, Paju-si (KR); Hea In Jung, Paju-si (KR); Sang Hun Baek, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 17/990,493

(22) Filed: Nov. 18, 2022

(65) Prior Publication Data

US 2023/0178034 A1 Jun. 8, 2023

(30) Foreign Application Priority Data

Dec. 3, 2021 (KR) ........................ 10-2021-0171978
Nov. 1, 2022 (KR) ........................ 10-2022-0143306

(51) Int. Cl.
*G09G 3/3291* (2016.01)

(52) U.S. Cl.
CPC ..... *G09G 3/3291* (2013.01); *G09G 2310/027* (2013.01); *G09G 2310/08* (2013.01); *G09G 2320/0247* (2013.01)

(58) Field of Classification Search
CPC ...... G09G 3/36; G09G 3/3266; G09G 3/3275; G09G 3/3291; G09G 2310/027; G09G 2310/08; G09G 2320/0247
See application file for complete search history.

(56) References Cited

U.S. PATENT DOCUMENTS

2020/0193915 A1* 6/2020 Noh ..................... G09G 3/3266
2022/0343871 A1* 10/2022 Huang ................. G09G 3/3618

* cited by examiner

*Primary Examiner* — Michael A Faragalla
(74) *Attorney, Agent, or Firm* — Birch, Stewart, Kolasch & Birch, LLP

(57) ABSTRACT

An electroluminescent display apparatus can include a display panel including at least one pixel; and a data driver configured to output a data voltage of a first gray level to the at least one pixel in a first refresh frame, output a flicker compensation data voltage to the at least one pixel in a second refresh frame, and output an anode reset voltage to the at least one pixel in at least one anode reset frame arranged between the first refresh frame and the second refresh frame, in which the anode reset voltage is a voltage for turning off a light emitting device included in the at least one pixel, and the flicker compensation data voltage is generated based on applying a weight to a data voltage of a second gray level.

25 Claims, 26 Drawing Sheets

FIG. 16

| Mode | | |
|---|---|---|
| Low Refresh Rate | Less Than 30Hz | On rising from Black to White : Output = (1.3) x input + (10)<br>On falling from White to Black : Output = (0.9) x input − (5) |
| Middle Refresh Rate | 30Hz~60Hz | On rising from Black to White : Output = (1.2) x input + (7)<br>On falling from White to Black : Output = (0.95) x input − (3) |
| High Refresh Rate | 60Hz~120Hz | On rising from Black to White : Output = (1.1) x input + (5)<br>On falling from White to Black : Output = (1.0) x input − (1) |

DATA DRIVER, ELECTROLUMINESCENT DISPLAY APPARATUS, AND DRIVING METHOD THEREOF

CROSS-REFERENCE TO RELATED APPLICATIONS

This application claims the priority benefit of the Korean Patent Application No. 10-2021-0171978 filed in the Republic of Korea on Dec. 3, 2021, and the Korean Patent Application No. 10-2022-0143306 filed in the Republic of Korea on Nov. 1, 2022, the entirety of all these applications are hereby incorporated by reference as if fully set forth herein.

BACKGROUND OF THE DISCLOSURE

Field of the Invention

The present disclosure relates to a data driver, an electroluminescent display apparatus, and a driving method thereof.

Discussion of the Related Art

Electroluminescent display apparatuses include a plurality of pixels arranged as a matrix and supply the pixels with voltages synchronized with image data, and thus, the pixels implement luminance corresponding to the image data.

Variable refresh rate (VRR) technology is available for varying a refresh rate based on an attribute of an image in electroluminescent display apparatuses. In the VRR technology, when an image does not change or remains more or less relatively constant, a data refresh period is lengthened to decrease power consumption (e.g., such as when displaying a static image or wallpaper).

In the VRR technology, when a data refresh period varies, a luminance deviation may occur at a time at which a refresh rate changes. Such a luminance deviation is recognized as a flicker, and due to this, display quality is reduced.

SUMMARY OF THE DISCLOSURE

To overcome the aforementioned problem of the related art, the present disclosure may provide a data driver, an electroluminescent display apparatus, and a driving method thereof, which adjusts a level of a flicker compensation data voltage based on a data refresh period to prevent flickers from occurring at a time at which a refresh rate changes.

To achieve these objects and other advantages and in accordance with the purpose of the disclosure, as embodied and broadly described herein, an electroluminescent display apparatus includes a display panel including at least one pixel and a data driver configured to output a data voltage of a first gray level to the at least one pixel in a first refresh frame, output a flicker compensation data voltage to the at least one pixel in a second refresh frame, and output an anode reset voltage to the at least one pixel in at least one anode reset frame arranged between the first refresh frame and the second refresh frame, in which the anode reset voltage is a voltage for turning off a light emitting device included in the at least one pixel during a partial period of the anode reset frame, the flicker compensation data voltage is a data voltage of a third gray level obtained by reflecting a weight in a data voltage of a second gray level, and a level of the flicker compensation data voltage when the number of anode reset frames is an N number (where N is a natural number) differs from a level of the flicker compensation data voltage when the number of anode reset frames is an M number (where M is a natural number greater than N).

In another aspect of the present disclosure, a data driver is characterized by outputting a data voltage of a first gray level to a pixel of a display panel in a first refresh frame, outputting a flicker compensation data voltage to the pixel in a second refresh frame, and outputting an anode reset voltage to the pixel in at least one anode reset frame arranged between the first refresh frame and the second refresh frame, in which the anode reset voltage is a voltage for turning off a light emitting device included in the pixel during a partial period of the anode reset frame, the flicker compensation data voltage is a data voltage of a third gray level obtained by reflecting a weight in a data voltage of a second gray level, and a level of the flicker compensation data voltage when the number of anode reset frames is an N number (where N is a natural number) differs from a level of the flicker compensation data voltage when the number of anode reset frames is an M number (where M is a natural number which is more than N).

In another aspect of the present disclosure, a driving method of an electroluminescent display apparatus includes outputting a data voltage of a first gray level to a pixel of a display panel in a first refresh frame, outputting a flicker compensation data voltage to the pixel in a second refresh frame, and outputting an anode reset voltage to the pixel in at least one anode reset frame arranged between the first refresh frame and the second refresh frame, in which the anode reset voltage is a voltage for turning off a light emitting device included in the pixel during a partial period of the anode reset frame, the flicker compensation data voltage is a data voltage of a third gray level obtained by reflecting a weight in a data voltage of a second gray level, and a level of the flicker compensation data voltage when the number of anode reset frames is an N number (where N is a natural number) differs from a level of the flicker compensation data voltage when the number of anode reset frames is an M number (where M is a natural greater than N).

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain principles of the disclosure. In the drawings:

FIG. 16 is a table illustrating a detailed example where weights reflected in a data voltage of an input gray level are differently set based on a refresh rate to adjust a level of a flicker compensation data voltage according to an embodiment of the present disclosure;

DETAILED DESCRIPTION OF THE EMBODIMENTS

Figure 1:
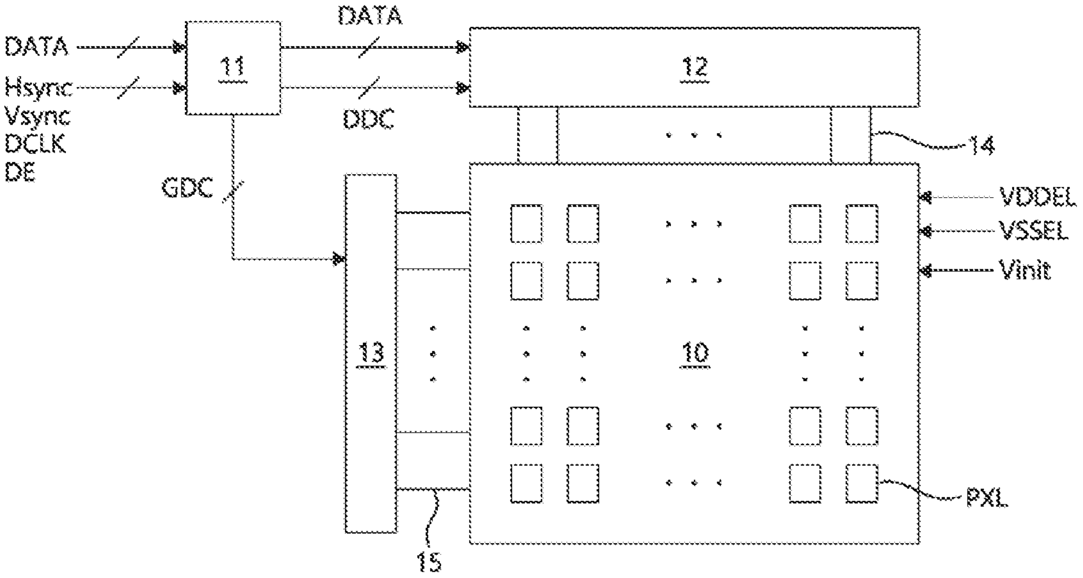
FIG. 1 is a diagram illustrating an electroluminescent display apparatus according to an embodiment of the present disclosure.

Advantages and features of the present disclosure, and implementation methods thereof will be clarified through following embodiments described with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. Furthermore, the present disclosure is only defined by scopes of claims.

The shapes, sizes, ratios, angles, numbers and the like disclosed in the drawings for description of various embodiments of the present disclosure to describe embodiments of the present disclosure are merely exemplary and the present disclosure is not limited thereto. Like reference numerals refer to like elements throughout. Throughout this specification, the same elements are denoted by the same reference numerals. As used herein, the terms "comprise", "having," "including" and the like suggest that other parts can be added unless the term "only" is used. As used herein, the singular forms "a," "an," and "the" are intended to include the plural forms as well, unless context clearly indicates otherwise.

Elements in various embodiments of the present disclosure are to be interpreted as including margins of error even without explicit statements.

In describing a position relationship, for example, when a position relation between two parts is described as "on~," "over~," "under~," "above," and "next~," one or more other parts may be disposed between the two parts unless "just" or "direct" is used.

It will be understood that, although the terms "first," "second," etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. Like reference numerals refer to like elements throughout.

Hereinafter, embodiments of the present disclosure will be described in detail with reference to the accompanying drawings. In the following embodiments, as an example of an electroluminescent display apparatus, an organic light emitting display apparatus including an organic light emitting material will be mainly described. However, the inventive concept is not limited to an organic light emitting display apparatus and may be applied to an inorganic light emitting display apparatus including an inorganic light emitting material.

FIG. 1 is a diagram illustrating an electroluminescent display apparatus according to an embodiment of the present disclosure.

Referring to FIG. 1, the electroluminescent display apparatus can include a display panel 10, a timing controller 11, a data driver 12, a gate driver 13, and a power circuit.

A plurality of pixels PXL included in the display panel 10 can be arranged as a matrix to configure a pixel array. In the pixel array, each of the pixels PXL can be connected to a data line 14, a gate line 15, an initialization power line, a high level power line, and a low level power line. Here, the gate line 15 connected to each pixel PXL can include two scan lines and two emission lines. Each pixel PXL can be supplied with a data voltage through the data line 14, scan signals through two scan lines, emission signals through two emission lines, an initialization voltage Vinit through the initialization power line, a high level driving voltage VDDEL through the high level power line, and a low level driving voltage VSSEL through the low level power line.

The initialization power line, the high level power line, and the low level power line can be connected to the power circuit. The power circuit can generate the initialization voltage Vinit, the high level driving voltage VDDEL, and the low level driving voltage VSSEL.

Each pixel PXL can perform a programming operation and an emission operation based on a driving waveform based on the scan signals and the emission signals to implement luminance corresponding to image data DATA. To this end, each pixel PXL can include a driving element which generates a driving current corresponding to the image data DATA and a light emitting device which emits light having brightness proportional to a level of the driving current. The driving element included in each pixel PXL can be implemented with an oxide transistor which is good in leakage current characteristic, but is not limited thereto.

Each pixel PXL can perform a programming operation for setting the driving current prior to an emission operation at every refresh frame. The programming operation according to the present embodiment can include an initialization operation of applying the initialization voltage Vinit to an anode electrode of a light emitting device to turn off the light emitting device, a sampling operation of sampling a threshold voltage of a driving element to reflect the sampled threshold voltage in a gate-source voltage of the driving element, and a driving current setting operation of reflecting image data DATA in the gate-source voltage of the driving element. In performing such a programming operation, the light emitting device can maintain a non-emission state.

The initialization voltage Vinit can be for preventing the light emitting device from emitting undesired light in the programming operation and can be selected within a voltage range which is sufficiently lower than an operation point voltage of the light emitting device, and for example, can be selected as a voltage at or near the low level driving voltage VSSEL.

Each pixel PXL can be driven based on variable refresh rate (VRR) technology. In order to implement the VRR technology, one or more anode reset frames can be disposed between adjacent refresh frames. In the anode reset frame, a data refresh operation may not be performed on pixels PXL, and luminance of a previous refresh frame can be maintained during the anode reset frame. However, the anode reset voltage can be applied to the pixels PXL during an anode reset interval in the anode reset frame. The anode reset interval of the anode reset frame can correspond to a programming operation interval of a refresh frame, and the anode reset voltage can be a voltage for stopping the emitting of light from the light emitting device during the anode reset interval. As a result, an emission maintenance time between the refresh frame and the anode reset frame can be equal. This will be described below with reference to FIGS. 5 and 6.

The timing controller 11 can receive digital video data DATA and a refresh rate variation information from a host system. The timing controller 11 can adjust the number of anode reset frames disposed between adjacent refresh frames based on the refresh rate variation information, and thus, can vary a refresh period of the digital video data DATA. The timing controller 11 can apply a weight to image data DATA corresponding to the refresh frame to modulate the image data DATA, in order to decrease flickers occurring at a time at which the anode reset frame is changed to the refresh frame.

The timing controller 11 can overall adjust a level of a weight which is to be applied to the image data DATA, based on the number of anode reset frames. The timing controller 11 can overall and further adjust a level of a weight which is to be applied to the image data DATA, based on an average transition amount of the image data DATA between adjacent refresh frames. The timing controller 11 can further adjust, by pixel row units, a level of a weight which is to be applied to the image data DATA, based on a distance between pixel rows and output terminals of the data driver 12. Here, a pixel row can denote a set of pixels PXL which share the same gate line 15 instead of a physical signal line and are adjacent to one another in a horizontal direction.

The timing controller 11 can supply the data driver 12 with weight-applied image data DATA. Also, the timing controller 11 can generate a data control signal DDC for controlling an operation timing of the data driver 12 and a gate control signal GDC for controlling an operation timing of the gate driver 13, based on timing signals, such as a vertical synchronization signal Vsync, a horizontal synchronization signal Hsync, a dot clock signal DCLK, and a data enable signal DE.

A detailed configuration and operation of the timing controller 11 will be described below with reference to FIG. 17.

The data driver 12 can digital-to-analog convert the image data DATA input the timing controller 11 based on the data control signal DDC in the refresh frame to generate a compensation data voltage. The compensation data voltage can be a flicker compensation data voltage which is generated by reflecting a weight in a data voltage of an input gray level. The data driver 12 can output the flicker compensation data voltage to the data lines 14 of the display panel 10 through output terminals in the programming operation interval of the refresh frame.

The data driver 12 can generate an anode reset voltage based on the data control signal DDC in the anode reset frame. The anode reset voltage can be a voltage irrelevant to the image data DATA. The data driver 12 can output the anode reset voltage to the data lines 14 of the display panel 10 through the output terminals in the anode reset interval of the anode reset frame.

The gate driver 13 can generate first gate signals based on the gate control signal GDC in the refresh frame. The first gate signals can include scan signals and emission signals. The gate driver 13 can output the first gate signals to the gate lines 15 of the display panel 10 in the refresh frame.

The gate driver 13 can generate second gate signals based on the gate control signal GDC in the anode reset frame. The second gate signals can include the scan signals and the emission signals. The gate driver 13 can output the second gate signals to the gate lines 15 of the display panel 10 in the anode reset frame.

The gate driver 13 can be directly provided in a bezel area of the display panel 10 based on a gate driver in panel (GIP) type. Here, the bezel area can correspond to a non-display area outside a screen area including the pixel array. The bezel area may not display an image.

Figure 2:
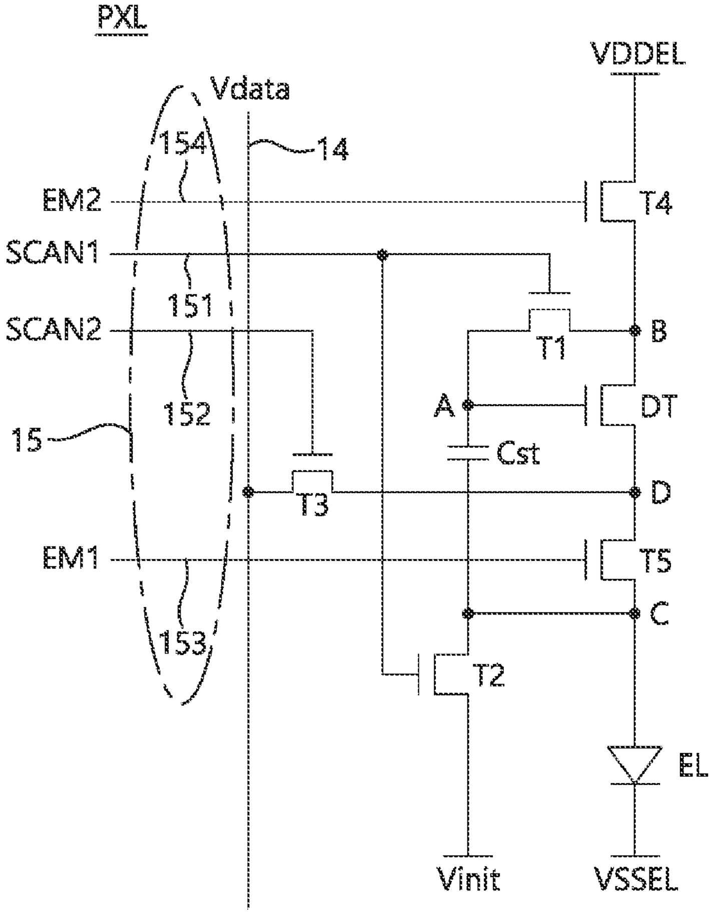
FIG. 2 is a diagram illustrating a circuit configuration of a pixel provided in a display panel of FIG. 1 according to an embodiment of the present disclosure.

FIG. 2 is a diagram illustrating a circuit configuration of a pixel provided in a display panel of FIG. 1. A pixel circuit of FIG. 2 can be merely an embodiment, and the technical spirit of the present disclosure is not limited to a configuration of the pixel circuit.

Referring to FIG. 2, a first pixel PXL of a plurality of pixels arranged in an $n^{th}$ (where n is a natural number) pixel row is illustrated.

The first pixel PXL can include a light emitting device EL, a driving element DT, first to fifth switch elements T1 to T5, and a storage capacitor Cst.

The light emitting device EL can be implemented with an organic light emitting diode (OLED) which emits light with a driving current supplied through the driving element DT. A multi-layer organic compound layer can be disposed between an anode electrode and a cathode electrode of the light emitting device EL. The organic compound layer can include a hole injection layer (HIL), a hole transport layer (HTL), an emission layer (EML), an electron transport layer (ETL), and an electron injection layer (EIL). The anode electrode of the light emitting device EL can be connected to a node C, and the cathode electrode of the light emitting device EL can be connected to an input terminal for the low level driving voltage VSSEL.

The driving element DT can generate the driving current applied to the light emitting device EL, based on a gate-source voltage thereof. A gate electrode of the driving element DT can be connected to a node A, a drain electrode thereof can be connected to a node B, and a source electrode thereof can be connected to a node D. The driving element DT can be implemented with an MOSFET including an oxide semiconductor layer, but is not limited thereto.

The first switch element T1 can be connected between the node A and the node B and can be turned on/off based on a first scan signal SCAN1 from the first scan line 151. A gate electrode of the first switch element T1 can be connected to the first scan line 151.

The second switch element T2 can be connected between an input terminal for the initialization voltage Vinit and the node C and can be turned on/off based on the first scan signal SCAN1 from the first scan line 151. A gate electrode of the second switch element T2 can be connected to the first scan line 151.

The third switch element T3 can be connected between the first data line 14 and the node D and can be turned on/off based on a second scan signal SCAN2 from the second scan line 152. A gate electrode of the third switch element T3 can be connected to the second scan line 152.

The fourth switch element T4 can be connected between an input terminal for the high level driving voltage VDDEL and the node B and can be turned on/off based on the second emission signal EM2 from the second emission line 154. A gate electrode of the fourth switch element T4 can be connected to the second emission line 154.

The fifth switch element T5 can be connected between the node D and the node C and can be turned on/off based on the first emission signal EM1 from the first emission line 153. A gate electrode of the fifth switch element T5 can be connected to the first emission line 153.

The storage capacitor Cst can be connected between the node A and the node C.

The first pixel PXL can automatically compensate for (hereinafter referred to as internal compensation) a threshold voltage deviation of the driving element DT through a pixel operation based on the connection configuration. An internal compensation operation can denote that a threshold voltage of the driving element DT is reflected in the gate-source voltage of the driving element DT in a pixel programming operation, and thus, compensation is performed so that the driving current generated by the driving element DT is not affected by a threshold voltage variation of the driving element DT.

Figure 3:
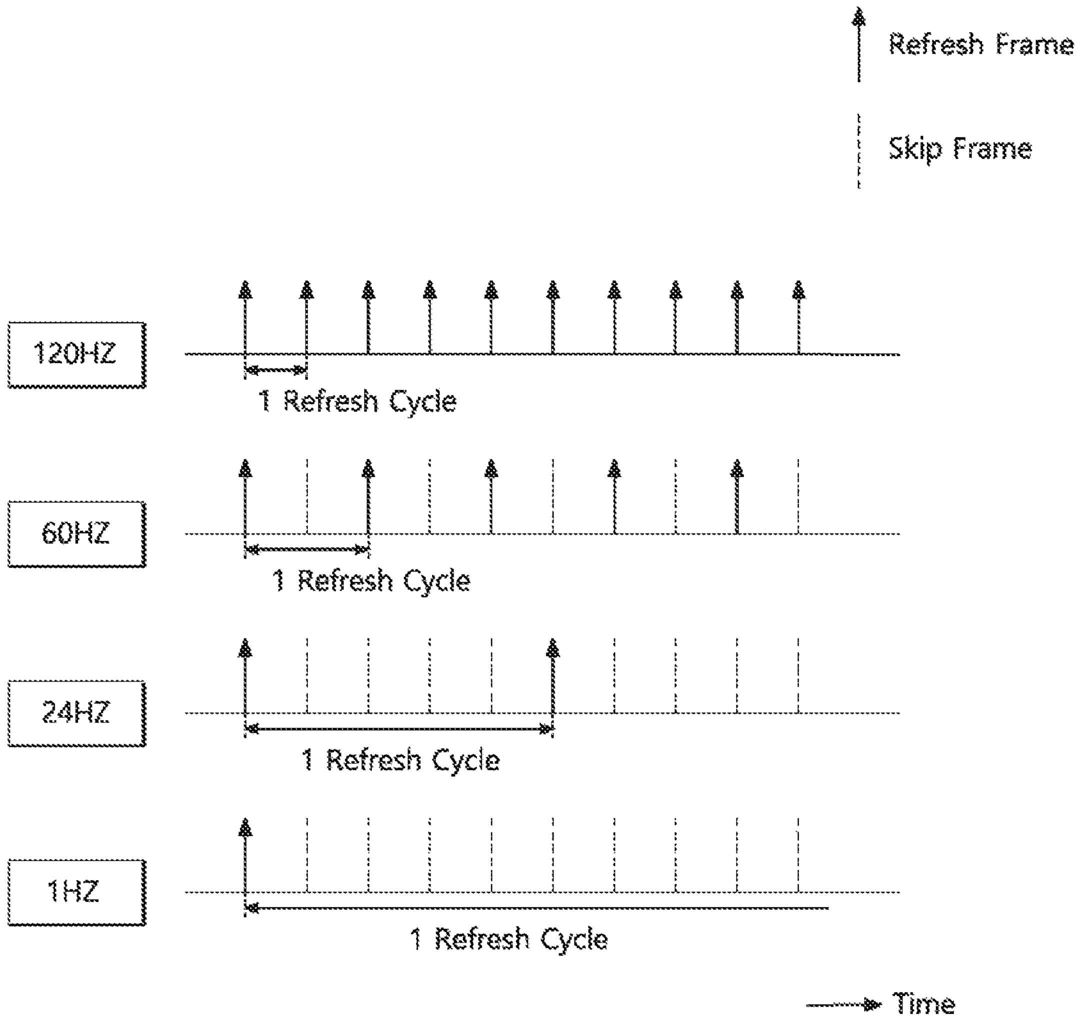
FIGS. 3 and 4 are diagrams illustrating technology for varying a refresh rate based on the number of skip frames disposed between refresh frames, in a comparative example of the present disclosure.
Figure 4:
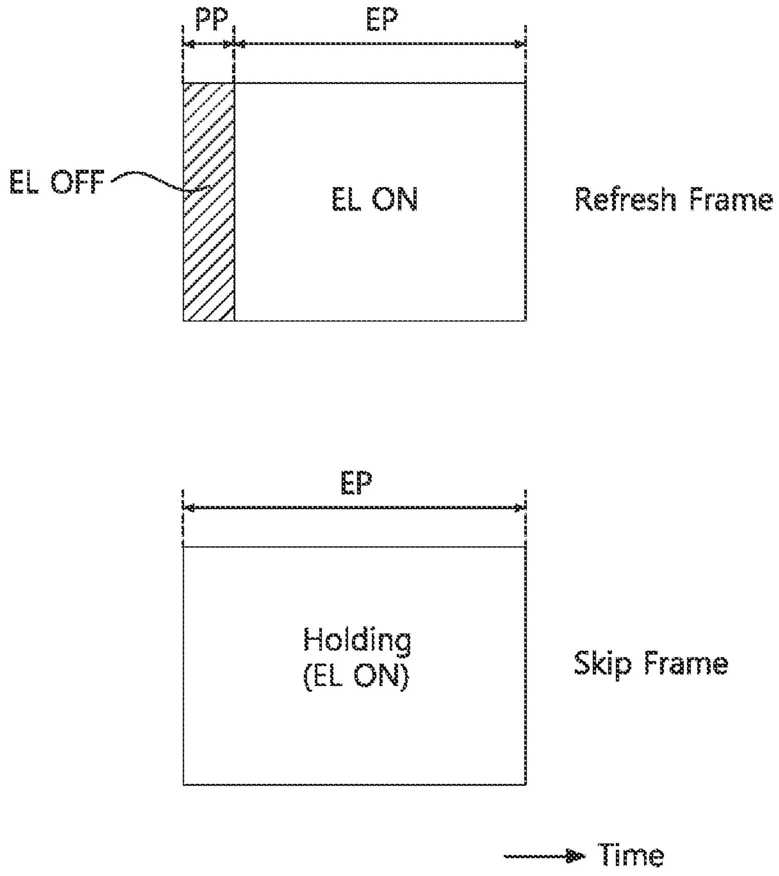

FIGS. 3 and 4 are diagrams illustrating variable frequency technology for determining a refresh rate based on the number of skip frames disposed between refresh frames, in a comparative example of the present disclosure.

Referring to FIGS. 3 and 4, a data refresh period implemented in the pixels of the display panel can vary based on refresh rate variation information input from the host system. The data refresh period can become longer as a refresh rate is lowered, and the number of skip frames can increase as the refresh rate is lowered. For example, the data refresh period can be 1 sec/120 in 120 Hz, 1 sec/60 in 60 Hz, 1 sec/24 in 24 Hz, and 1 sec in 1 Hz. The number of skip frames disposed between two adjacent refresh frames can be zero in 120 Hz, one in 60 Hz, four in 24 Hz, and 119 in 1 Hz.

The refresh frame can include a programing operation interval PP and an emission operation interval EP. As described above, the light emitting device can emit light in only the emission operation interval EP and may not emit light in the programing operation interval PP.

The skip frame can include only the emission operation interval EP (e.g., no programing operation interval PP during a skip frame). In the emission operation interval EP, emission luminance of an immediately previous refresh frame can be maintained intactly.

A length of the emission operation interval EP of the skip frame can be longer than the emission operation interval EP of the refresh frame. Therefore, when comparing a luminance integral amount for a certain time, as a refresh rate is lowered (e.g., as the number skip frames increases), the luminance integral amount can increase. For example, a luminance integral amount for a certain time can be higher in 60 Hz than 120 Hz, higher in 24 Hz than 60 Hz, and higher in 1 Hz than 24 Hz.

According to the comparative example described above, due to a luminance integral amount difference based on the refresh rate, flickers can be recognized at a time at which the refresh rate varies, (e.g., such was when a display switches from a 120 Hz refresh rate to a 24 Hz refresh rate).

Figure 5:
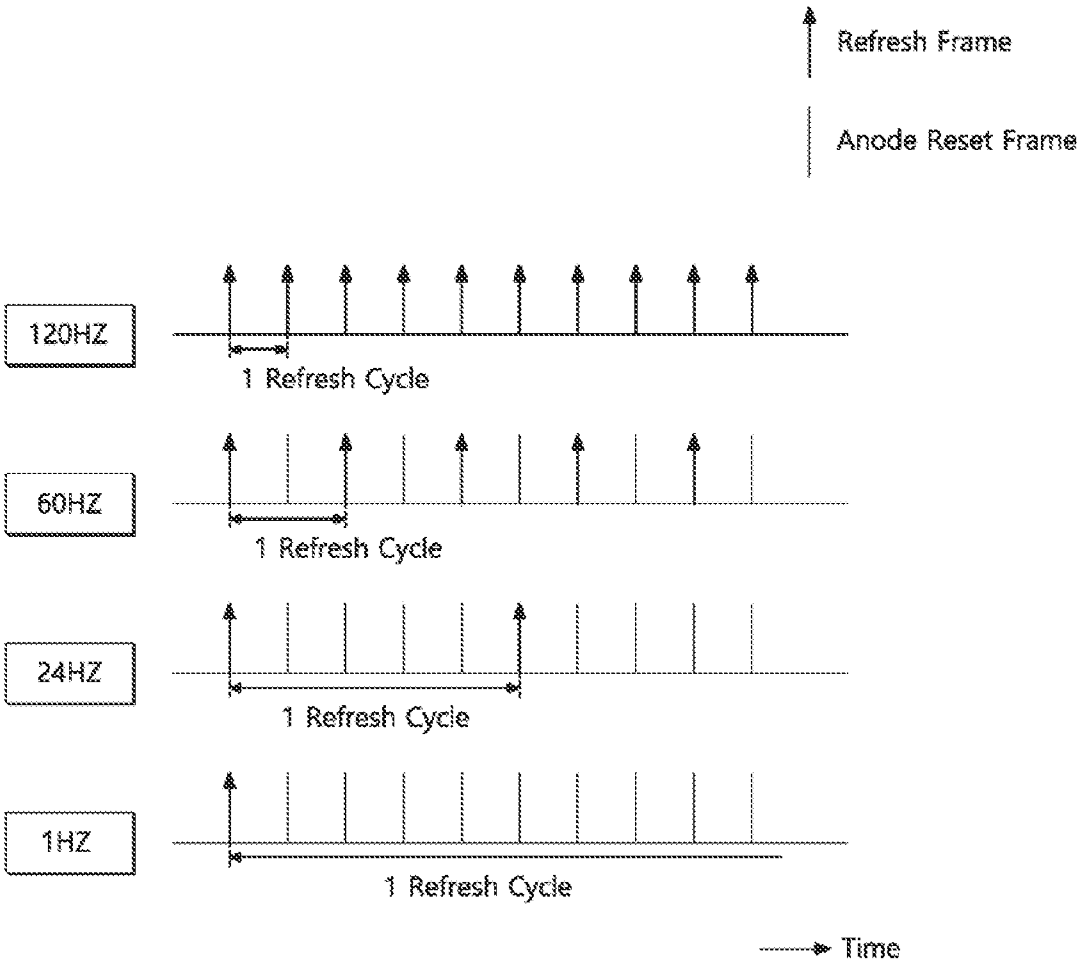
FIGS. 5 and 6 are diagrams illustrating technology for varying a refresh rate based on the number of anode reset frames disposed between refresh frames, in an embodiment of the present disclosure.
Figure 6:
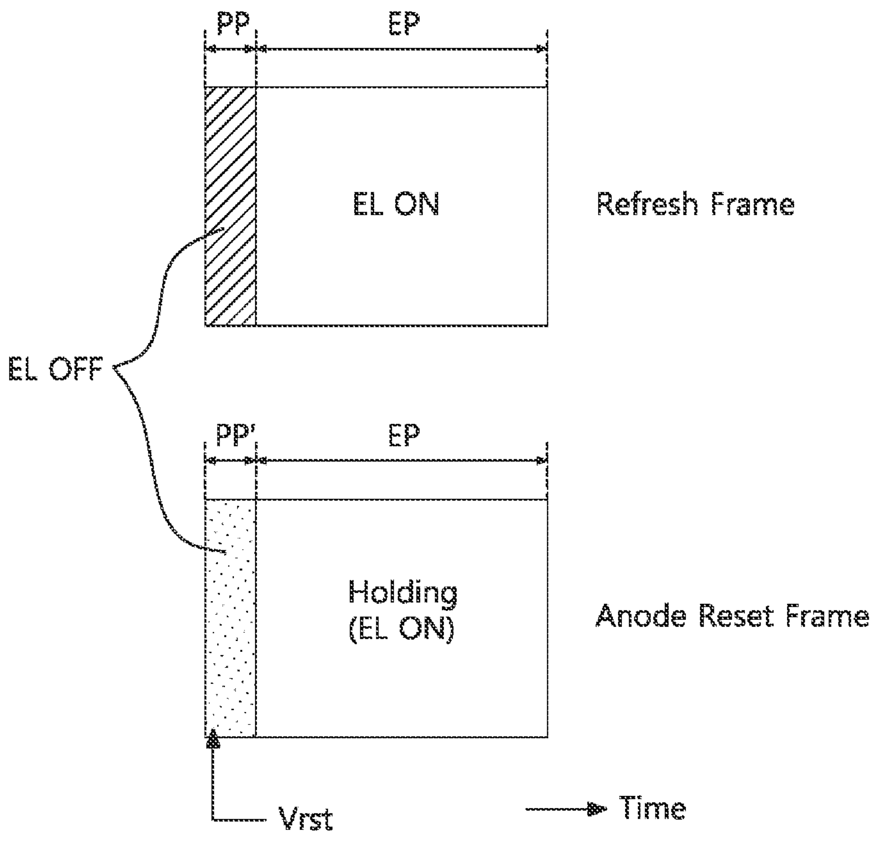

FIGS. 5 and 6 are diagrams illustrating variable frequency technology for determining a refresh rate based on the number of anode reset frames disposed between refresh frames, in an embodiment of the present disclosure.

Referring to FIGS. 5 and 6, a data refresh period implemented in the pixels of the display panel can vary based on the refresh rate variation information input from the host system. The data refresh period can become longer as a refresh rate is lowered, and the number of anode reset frames can increase as the refresh rate is lowered. For example, the data refresh period can be 1 sec/120 in 120 Hz, 1 sec/60 in 60 Hz, 1 sec/24 in 24 Hz, and 1 sec in 1 Hz. The number of anode reset frames disposed between two adjacent refresh frames can be zero in 120 Hz, one in 60 Hz, four in 24 Hz, and 119 in 1 Hz.

The refresh frame can include a programing operation interval PP and an emission operation interval EP. As described above, the light emitting device can emit light in only the emission operation interval EP and may not emit light in the programing operation interval PP.

The anode reset frame can include an anode reset interval PP' arranged before the emission operation interval EP. In the emission operation interval EP, emission luminance of an immediately previous refresh frame can be maintained intact. The anode reset interval PP' can correspond to a programming operation interval PP of a refresh frame, and the light emitting device may not emit light when an anode reset voltage Vrst is applied to the anode electrode of the light emitting device in the anode reset interval PP'.

A length of the anode reset interval PP' may be equal to or approximately equal to that of the programming operation interval PP so that a luminance integral amount of the anode reset frame is equal to or approximately equal to a luminance integral amount of the refresh frame.

According to the embodiment described above, a luminance integral amount difference based on the refresh rate may not occur, and thus, flickers caused by the luminance integral amount difference may be prevented.

Figure 7:
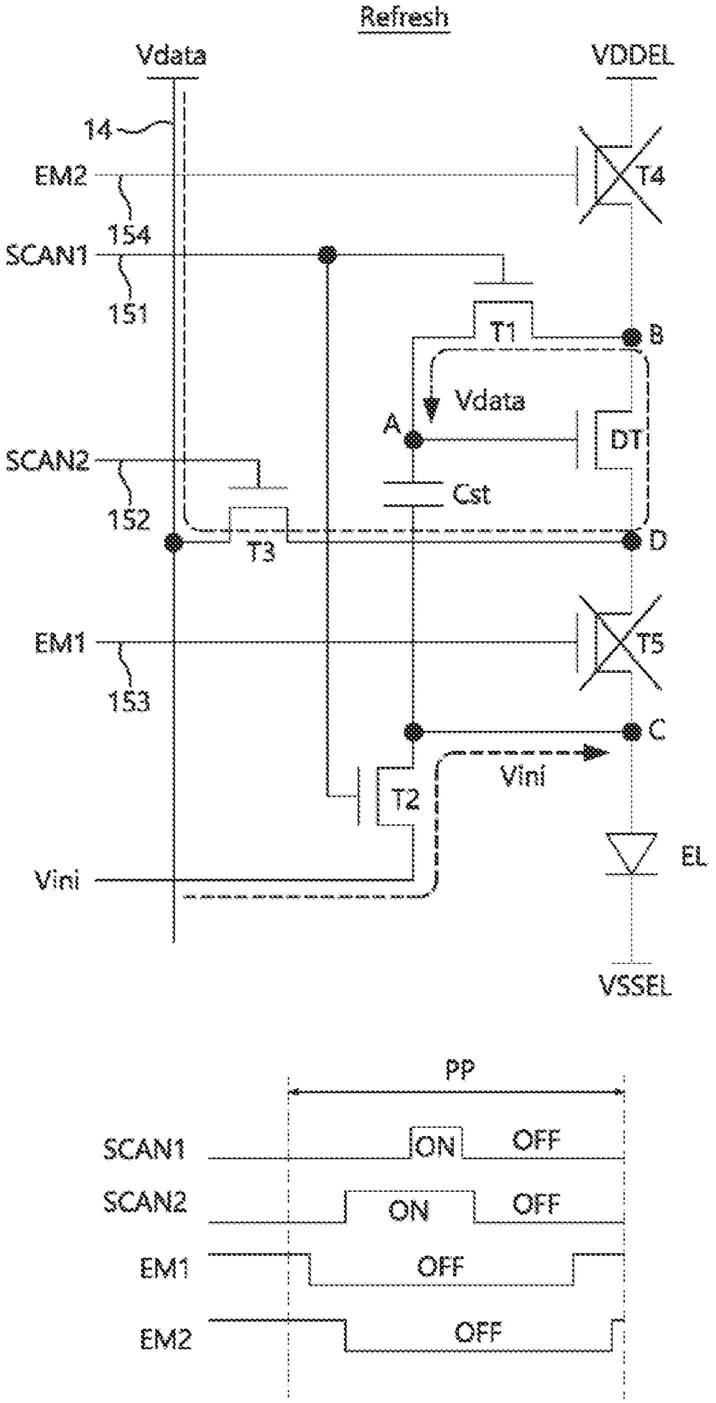
FIG. 7 is a diagram illustrating a refresh operation performed on the pixel of FIG. 2 according to an embodiment of the present disclosure.

FIG. 7 is a diagram illustrating a refresh operation performed on the pixel of FIG. 2. The refresh operation of FIG. 7 can be performed in a programming operation interval PP of a refresh frame.

Referring to FIG. 7, in the programming operation interval PP of the refresh frame, when the first scan signal SCAN1 and the second scan signal SCAN2 are input at an on level, the first to third switch elements T1 to T3 can be turned on. When the first to third switch elements T1 to T3 are turned on, the node A, the node B, and the node D can be refreshed to a new data voltage Vdata, and the node C can be initialized to the initialization voltage Vini. Here, the new data voltage Vdata can be a flicker compensation data voltage.

Such a refresh operation can be performed in a state where the fourth and fifth switch elements T4 and T5 are turned off. In performing the refresh operation, the light emitting device EL may not emit light.

Figure 8:
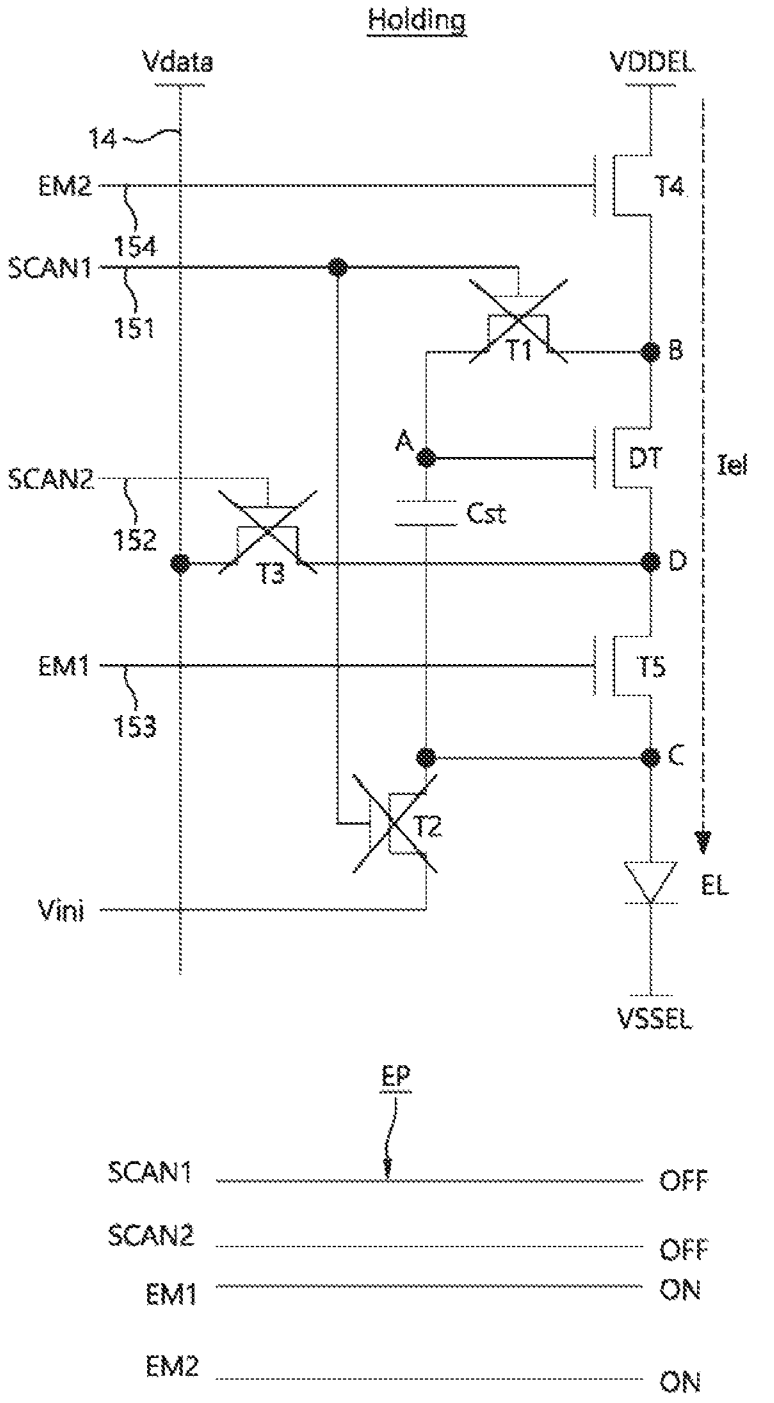
FIG. 8 is a diagram illustrating a holding operation performed on the pixel of FIG. 2 according to an embodiment of the present disclosure.

FIG. 8 is a diagram illustrating a holding operation performed on the pixel of FIG. 2. The holding operation of FIG. 8 can be performed in an emission operation interval EP of a refresh frame.

Referring to FIG. 8, in the emission operation interval EP of the refresh frame, the first scan signal SCAN1 and the second scan signal SCAN2 are input at an off level, and the first emission signal EM1 and the second emission signal EM2 can be input at an on level. When the first to third switch elements T1 to T3 are turned off and the fourth and fifth switch elements T4 and T5 are turned on, the light emitting device EL can emit light with a driving current Iel. The driving current Iel can be determined based on a gate-source voltage of the driving element DT set in the programming operation interval PP.

Figure 9:
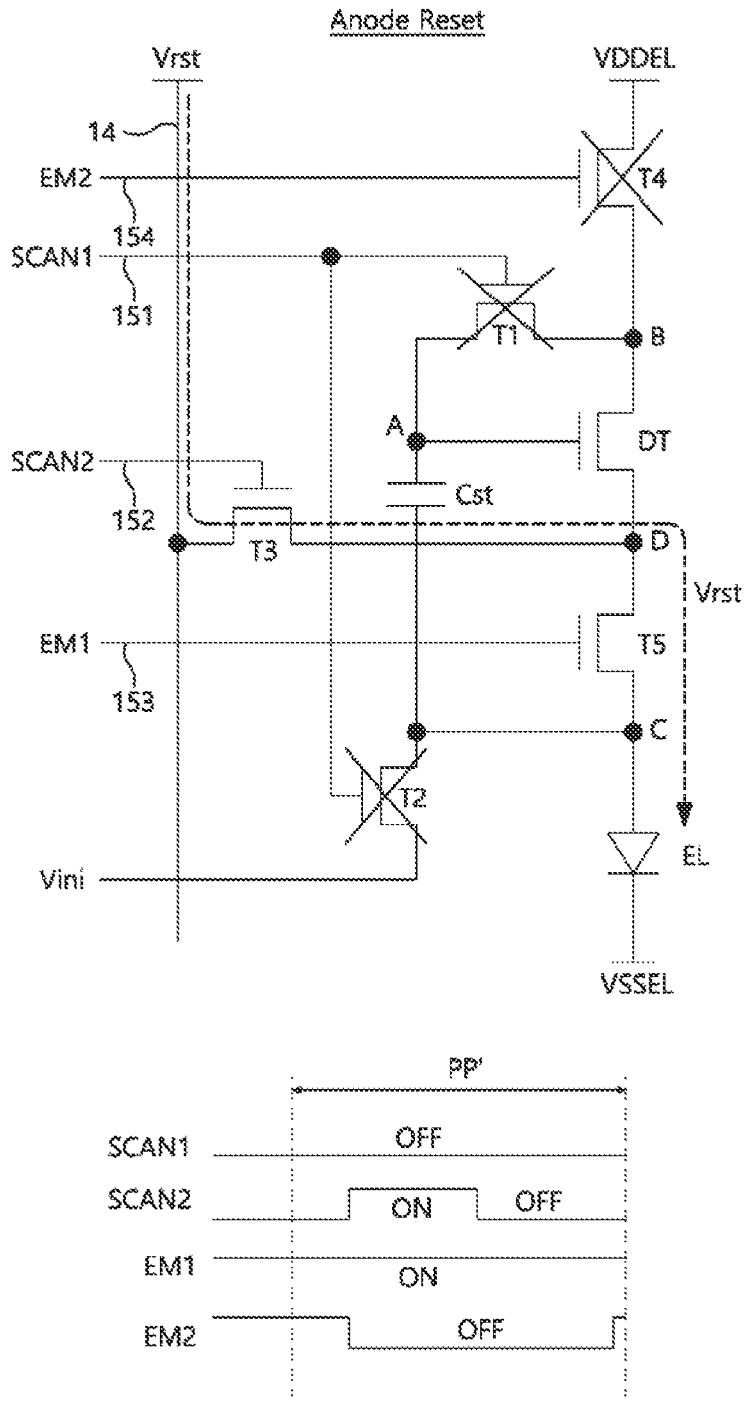
FIG. 9 is a diagram illustrating an anode reset operation performed on the pixel of FIG. 2 according to an embodiment of the present disclosure.
Figure 10:
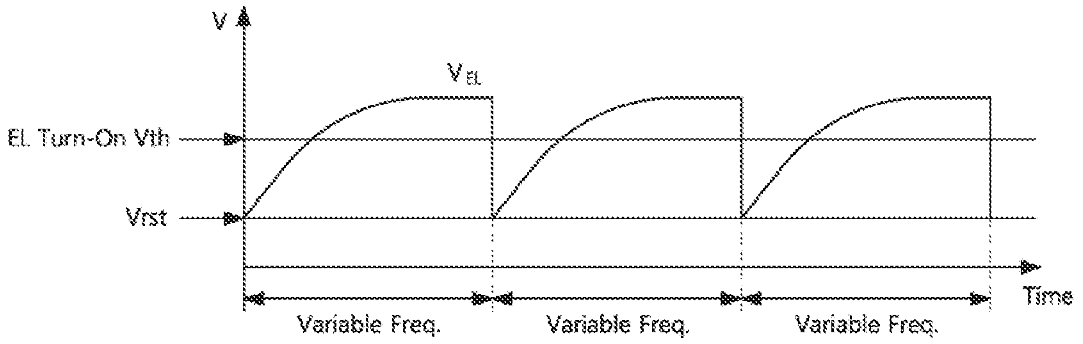
FIG. 10 is a diagram illustrating an embodiment of an anode reset voltage supplied to a pixel in an anode reset operation process of FIG. 9 according to an embodiment of the present disclosure.

FIG. 9 is a diagram illustrating an anode reset operation performed on the pixel of FIG. 2, which is performed between adjacent refresh frames. FIG. 10 is a diagram illustrating an embodiment of an anode reset voltage supplied to a pixel in an anode reset operation process of FIG. 9.

The anode reset operation of FIG. 9 can be performed in an anode reset interval PP' of an anode reset frame. Referring to FIG. 9, when the second scan signal SCAN2 and the first emission signal EM1 are input at an on level in a state where the first scan signal SCAN1 and the second emission signal EM2 are input at an off level, in the anode reset interval PP', an anode reset voltage Vrst can be supplied to the node C through the data line 14 and the third and fifth switch elements T3 and T5. The anode reset voltage Vrst supplied to the node C can be applied to the anode electrode of the light emitting device EL to turn off the light emitting device EL. To this end, the anode reset voltage Vrst can be a voltage which is lower than a turn-on threshold voltage of the light emitting device EL as in FIG. 10.

Furthermore, in performing the anode reset operation, the first, second, and fourth switch elements T1, T2, and T4 maintain an off state.

In the anode reset frame, an emission operation interval can be arranged next to or adjacent to the anode reset interval PP'. The emission operation interval of the anode reset frame can be equal to or substantially the same as the emission operation interval EP of the refresh frame.

A luminance waveform of the anode reset frame can be equal to a luminance waveform of the refresh frame through the anode reset operation. That is, a luminance integral amount of the anode reset frame can be equal to a luminance integral amount of the refresh frame through the anode reset operation, and thus, flickers caused by a luminance integral amount difference can be prevented.

According to VRR technology according to the present disclosure, as described above, flickers caused by a luminance integral amount difference can be prevented, a grayscale response delay can occur when the anode reset frame is changed to or transitions to the reset frame, and another problem can occur where a grayscale response delay degree varies based on a data refresh period. A grayscale response delay amount difference based on the data refresh period can be another cause of a flicker.

Hereinafter, a method for compensating for a grayscale response delay phenomenon and flickers caused thereby can be proposed.

Figure 11:
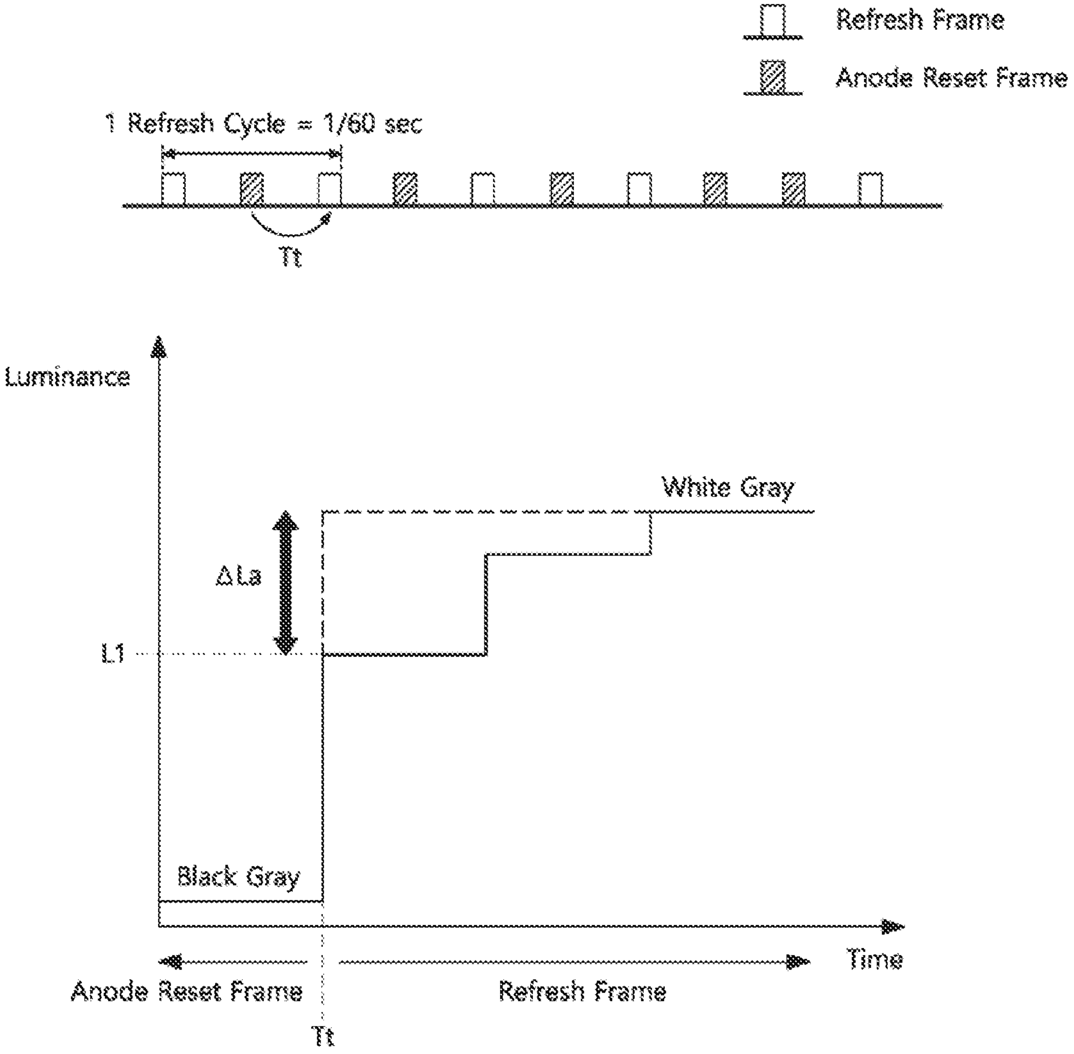
FIGS. 11 to 14 are diagrams illustrating a grayscale response delay phenomenon occurring when an anode reset frame is changed to a reset frame according to embodiments of the present disclosure.
Figure 12:
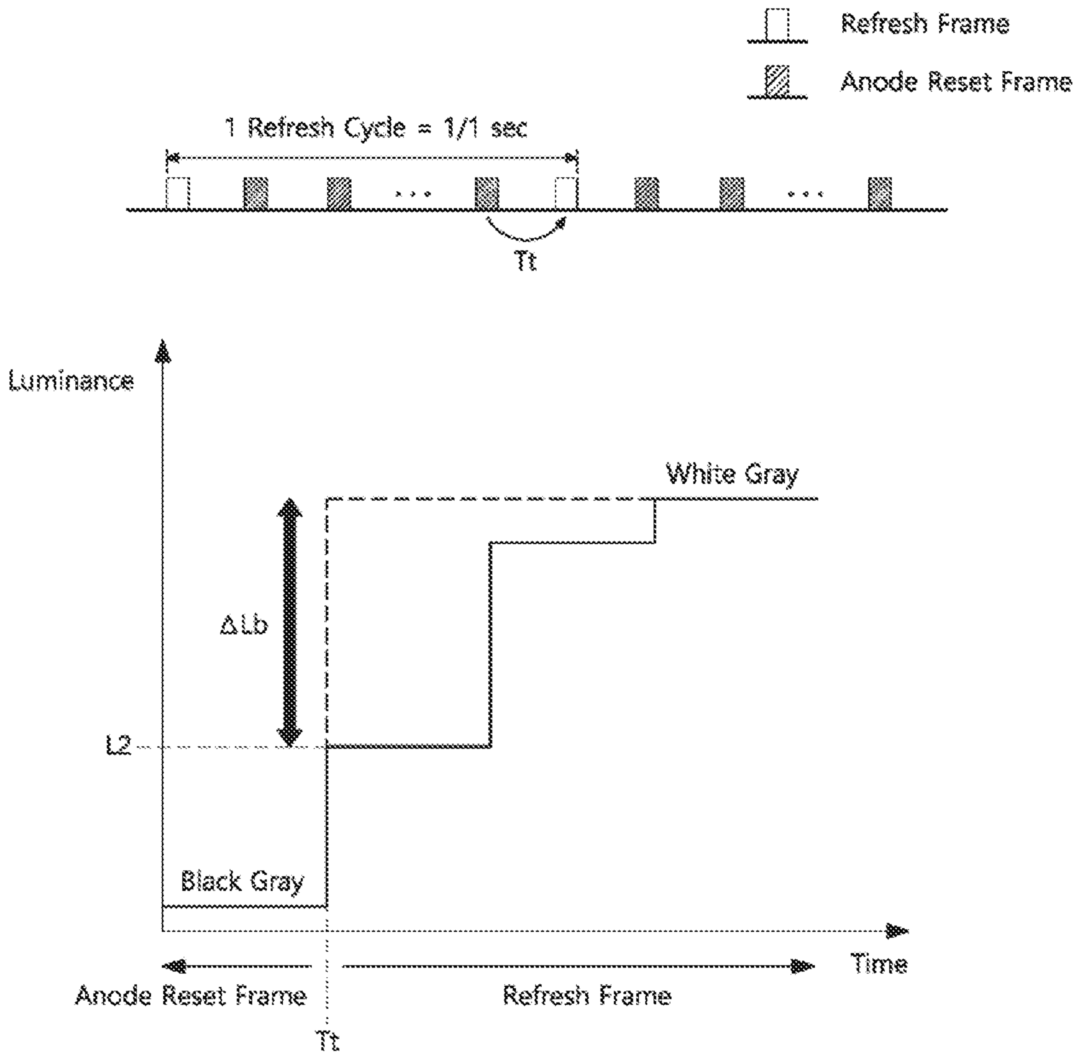

FIGS. 11 and 12 are diagrams illustrating a grayscale response delay phenomenon occurring at a time Tt at which an anode reset frame of a first gray level (for example, a black gray level) is changed to or transitions to a refresh frame of a second gray level (for example, a white gray level). For example, a pixel transitions from black to a bright color, and the delayed step response corresponding to ΔLa and L1 can be noticed.

Referring to FIG. 11, in a refresh rate mode of 60 Hz, the black gray level can first increase up to a first gray level L1 that is lower than the white gray level at the change time Tt, and then, can further increase up to the white gray level from the first gray level L1 in the refresh frame, based on a step-to-step scheme. That is, the black gray level can increase via a plurality of steps as shown in FIG. 11.

Referring to FIG. 12, in a refresh rate mode of 1 Hz, the black gray level can increase up to a second gray level L2 that is lower than the white gray level at the change time Tt, and then, can further increase up to the white gray level from the second gray level L2 in the refresh frame, based on the step-to-step scheme. That is, the black gray level can increase via a plurality of steps as shown in FIG. 12. Here, the second gray level L2 can have a value which is less than that of the first gray level L1 shown in FIG. 11.

Therefore, a grayscale response delay amount can increase and become worse as a refresh rate is lowered. For example, a grayscale response delay amount can be ΔLa in a refresh rate mode of 60 Hz shown in FIG. 11, and a grayscale response delay amount can be ΔLb in a refresh rate mode of 1 Hz shown in FIG. 12. Here, ΔLb can be greater than ΔLa. The reason can be because a data refresh period is 1/60 sec and a time for maintaining the black gray level through the anode reset frame is 1/120 sec in the refresh rate mode of 60 Hz, and a data refresh period is 1 sec and a time for maintaining the black gray level through the anode reset frame is 59/60 sec in the refresh rate mode of 1 Hz. Comparing with the refresh rate mode of 60 Hz, in the refresh rate mode of 1 Hz, because a time for maintaining the black gray level through the anode reset frame is relatively longer, a grayscale response delay amount can be relatively greater. In other words, comparing with the refresh rate mode of 60 Hz, in the refresh rate mode of 1 Hz, because the number of anode reset frames is relatively more, a grayscale response delay amount can be relatively greater.

Such a grayscale response delay amount difference can cause a luminance deviation in the refresh frame. Also, flickers can be recognized in the refresh frame due to this type of luminance deviation.

Figure 13:
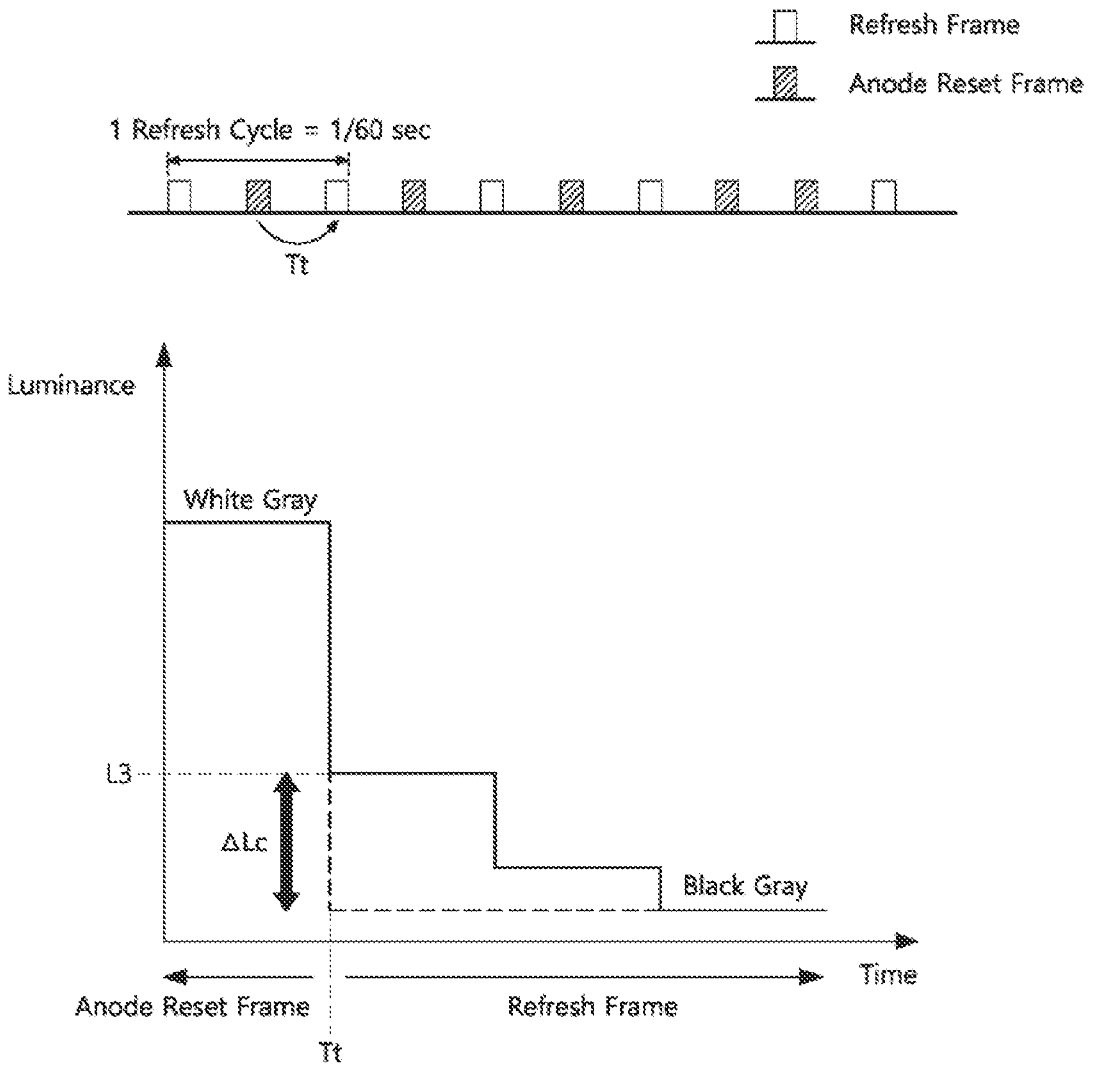
Figure 14:
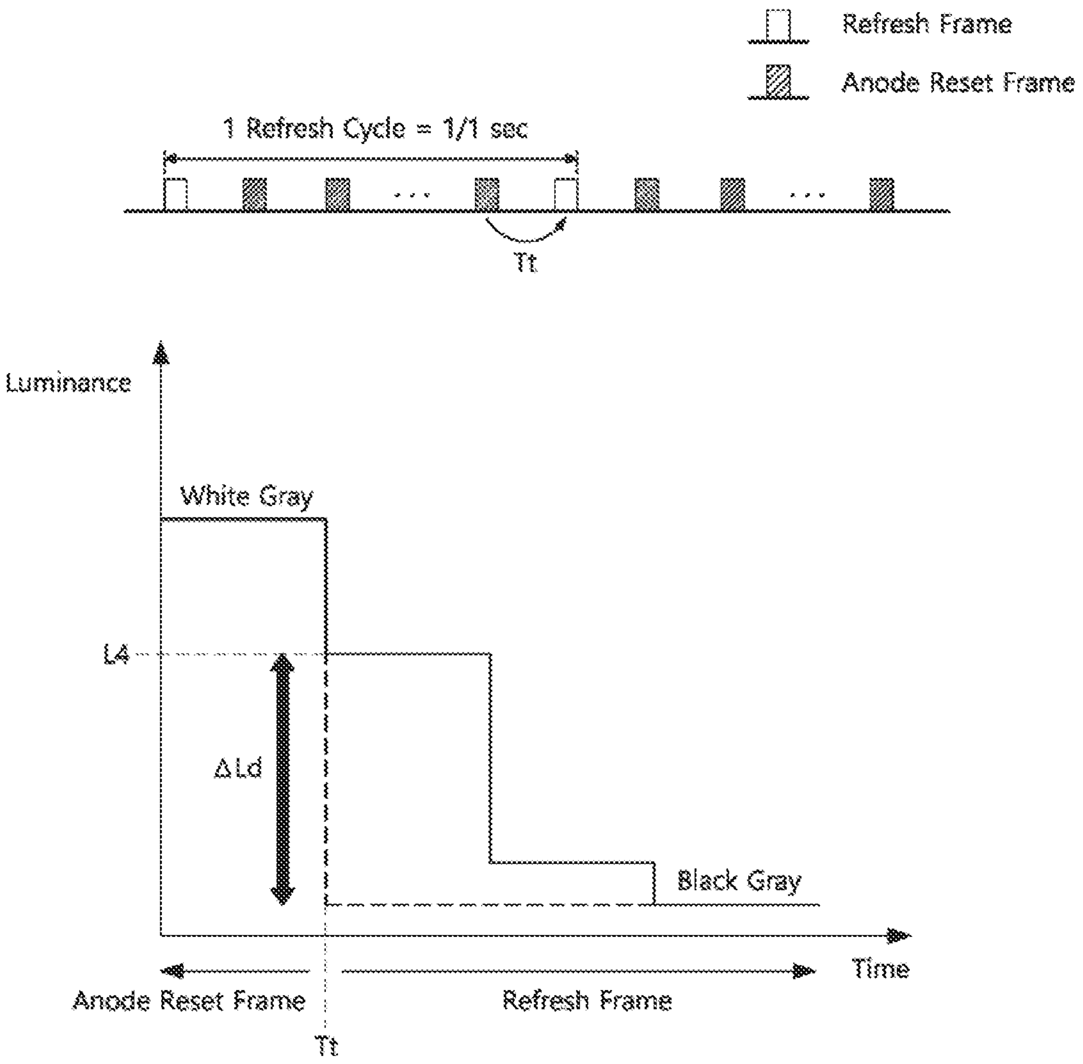

FIGS. 13 and 14 are diagrams illustrating a grayscale response delay phenomenon occurring at a time Tt at which an anode reset frame of a first gray level (for example, a white gray level) is changed to or transitions to a refresh frame of a second gray level (for example, a black gray level). For example, this is a situation where the pixel transitions from a bright color to black.

Referring to FIG. 13, in a refresh rate mode of 60 Hz, the white gray level can decrease down to a third gray level L3 that is higher than the black gray level at the change time Tt, and then, can decrease down even further to finally arrive at the black gray level from the third gray level L3 in the refresh frame, based on the step-to-step scheme. That is, the white gray level can decrease via a plurality of steps as shown in FIG. 13.

Referring to FIG. 14, in a refresh rate mode of 1 Hz, the white gray level can decrease down to a fourth gray level L4 that is much higher than the black gray level at the change time Tt, and then, can decrease down further to the black gray level from the fourth gray level L4 in the refresh frame, based on the step-to-step scheme. That is, the white gray level can decrease via a plurality of steps as shown in FIG. 14. Here, the fourth gray level L4 can have a value which is greater than that of the third gray level L3 shown in FIG. 13.

Therefore, a grayscale response delay amount can increase as a refresh rate is lowered or a data refresh period is made longer. For example, a grayscale response delay amount can be ΔLc in a refresh rate mode of 60 Hz shown in FIG. 13, and a grayscale response delay amount can be ΔLd in a refresh rate mode of 1 Hz shown in FIG. 14. Here, ΔLd can be greater than ΔLc. The reason can be because a data refresh period is 1/60 sec and a time for maintaining the white gray level through the anode reset frame is 1/120 sec in the refresh rate mode of 60 Hz, and a data refresh period is 1 sec and a time for maintaining the white gray level through the anode reset frame is 59/60 sec in the refresh rate mode of 1 Hz. Comparing with the refresh rate mode of 60 Hz, in the refresh rate mode of 1 Hz, because a time for maintaining the white gray level through the anode reset frame is relatively longer, a grayscale response delay amount can be relatively greater. In other words, comparing with the refresh rate mode of 60 Hz, in the refresh rate mode of 1 Hz, because the number of anode reset frames is relatively more, a grayscale response delay amount can be relatively greater. In other words, slower refresh rates can cause poorer response times when transitioning from black to a bright color and when transitioning from a bright color to black.

Such a grayscale response delay amount difference can cause a luminance deviation in the refresh frame. Also, flickers can be recognized in the refresh frame due to the luminance deviation.

Figure 15A:
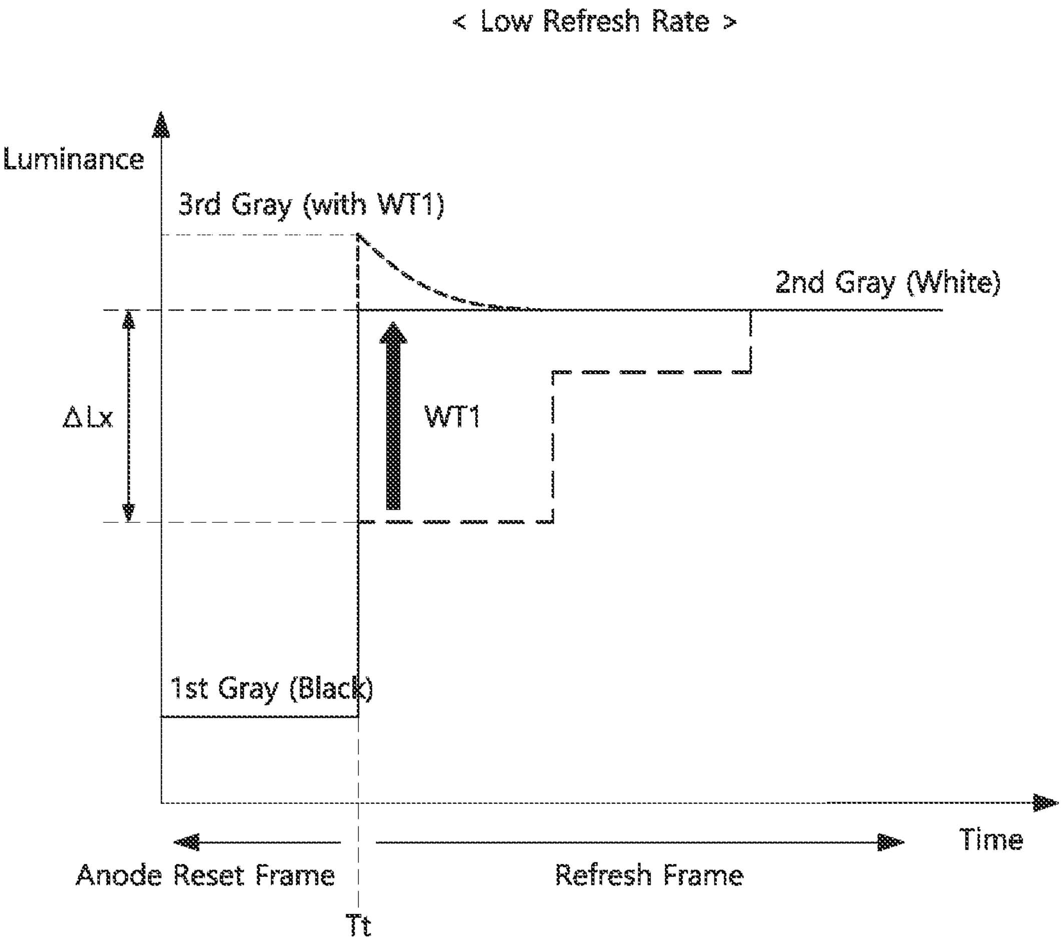
FIGS. 15A to 15C are diagrams illustrating an example where a level of a flicker compensation data voltage is differently set based on a refresh rate, to compensate for flickers caused by a grayscale response delay amount difference according to embodiments of the present disclosure.
Figure 15B:
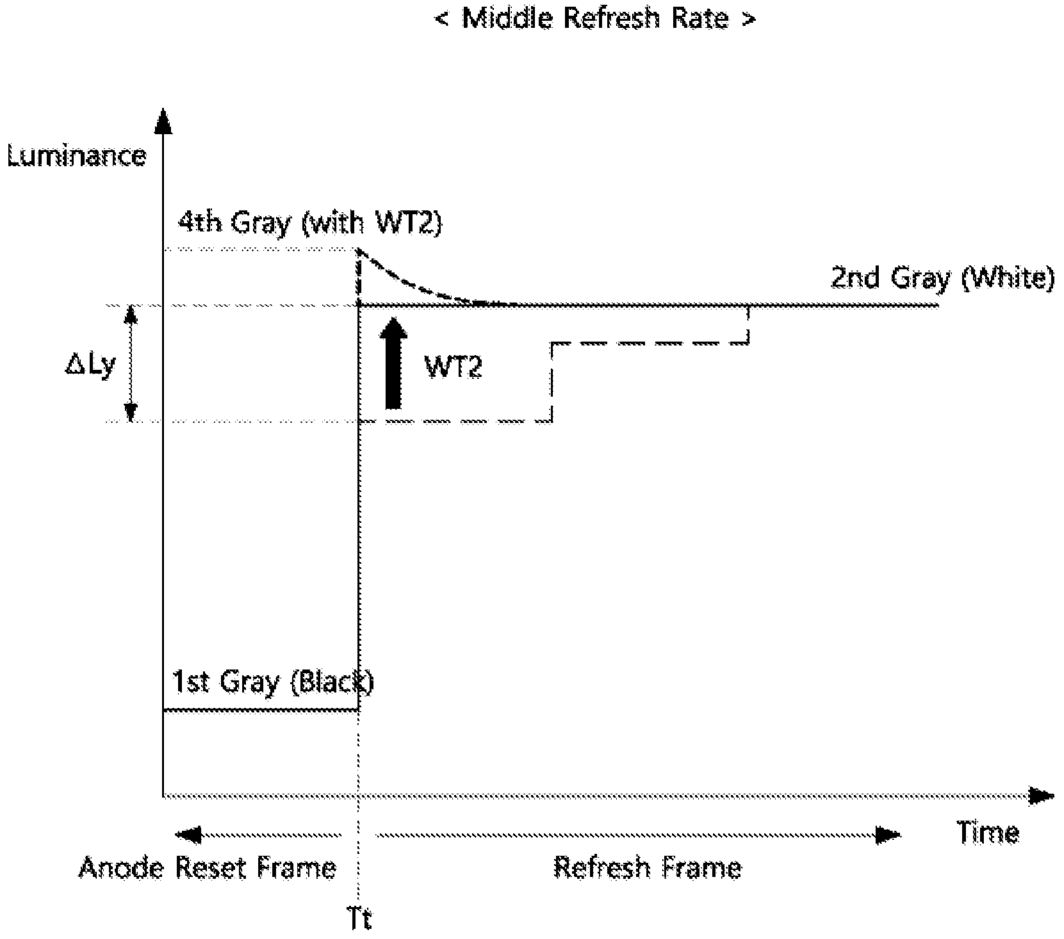
Figure 15C:
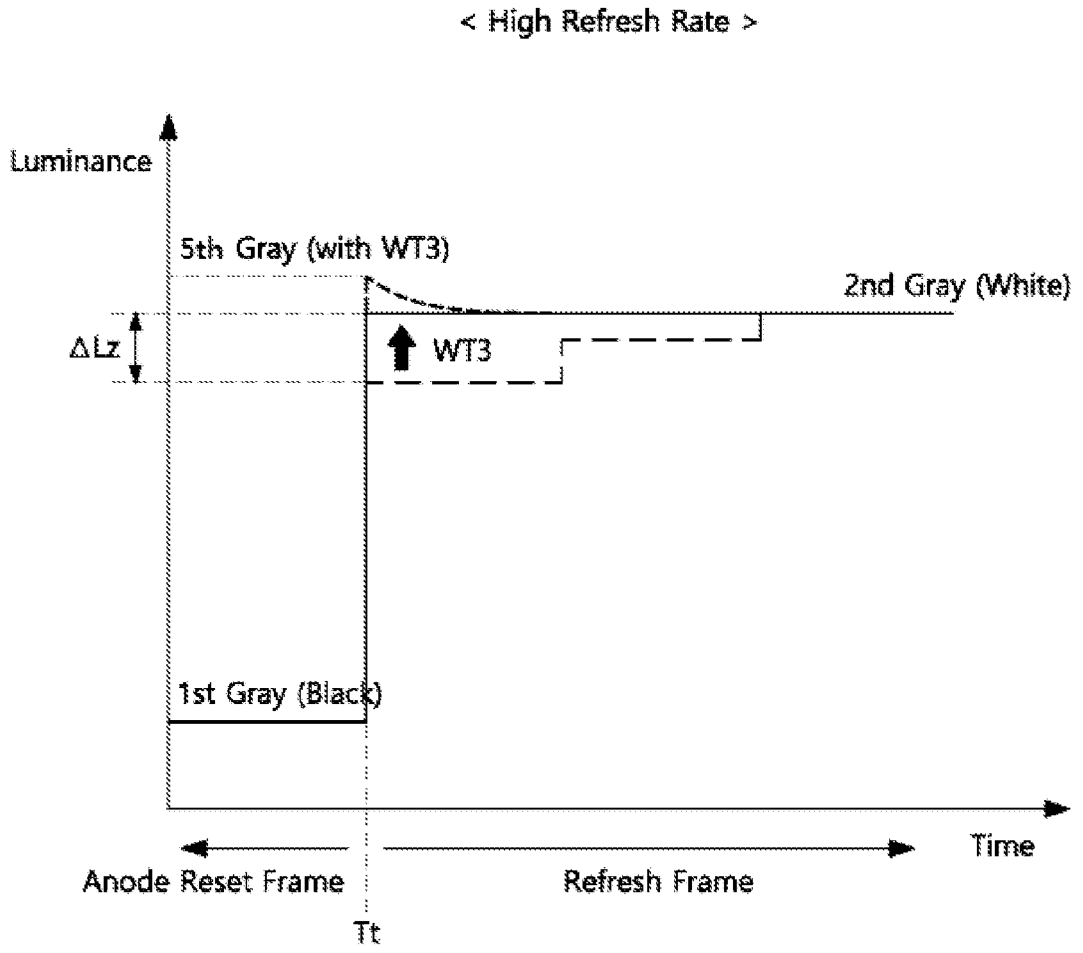

FIGS. 15A to 15C are diagrams illustrating an example where a level of a flicker compensation data voltage is differently set based on a refresh rate (or the number of anode reset frames), to compensate for flickers caused by a grayscale response delay amount difference. For example, the data voltage can be adjusted to have a type of under-damped waveform, in order to provide a pixel with an optimum transition when going from black to a bright color.

FIGS. 15A to 15C show a concept which compensates for a grayscale response delay phenomenon occurring at a time Tt at which an anode reset frame of a first gray level (a black gray level) is changed to a refresh frame of a second gray level (a white gray level).

Referring to FIG. 15A, under a low refresh rate mode having a grayscale response delay amount of ΔLx, the data driver can output a flicker compensation data voltage having a first level to pixels in a refresh frame. The flicker compensation data voltage having the first level can be a compensation voltage for minimizing the grayscale response delay amount of ΔLx and can be a data voltage of a third gray level obtained by reflecting a first weight WT1 in a data voltage of the second gray level.

Referring to FIG. 15B, under a middle refresh rate mode having a grayscale response delay amount of ΔLy, the data driver can output a flicker compensation data voltage having a second level to the pixels in the refresh frame. The flicker compensation data voltage having the second level can be a compensation voltage for minimizing the grayscale response delay amount of ΔLy and can be a data voltage of a fourth gray level obtained by reflecting a second weight WT2 in the data voltage of the second gray level.

Referring to FIG. 15C, under a high refresh rate mode having a grayscale response delay amount of ΔLz, the data driver can output a flicker compensation data voltage having a third level to the pixels in the refresh frame. The flicker compensation data voltage having the third level can be a compensation voltage for minimizing the grayscale response delay amount of ΔLz and can be a data voltage of a fifth gray level obtained by reflecting a third weight WT3 in the data voltage of the second gray level.

In FIGS. 15A to 15C, ΔLx>ΔLy>ΔL, and WT1>WT2>WT3. Also, each of the first to third weights WT1 to WT3 can be a rising weight, and each of data voltages of the third to fifth gray levels can be higher than the data voltage of the second gray level which is a target. In the data voltages of the third to fifth gray levels, the data voltage of the third gray level can be highest, the data voltage of the fourth gray level can be second high, and the data voltage of the fifth gray level can be lowest. For example, greater weights can be applied for compensation, as the refresh rate becomes slower or the data refresh period becomes longer, and faster refresh rates use less compensation.

Furthermore, the compensation concept illustrated in FIGS. 15A to 15C can be applied to a concept which compensates for a grayscale response delay phenomenon occurring at a time Tt at which an anode reset frame of a white gray level is changed to a refresh frame of a black gray level.

In this situation, ΔLx>ΔLy>ΔLz, and WT1>WT2>WT3. Also, each of the first to third weights WT1 to WT3 can be a falling weight, and each of the data voltages of the third to fifth gray levels can be lower than the data voltage of the second gray level which is a target. In the data voltages of the third to fifth gray levels, the data voltage of the third gray level can be lowest, the data voltage of the fourth gray level can be second low, and the data voltage of the fifth gray level can be highest.

Furthermore, each of the first to third weights WT1 to WT3 described above can be a first global weight which is overall applied to (e.g., applied by screen units) data voltages of one screen in a corresponding refresh rate.

The first global weight can be further adjusted by screen units based on a second global weight proportional to an average transition amount of data voltages of one screen which are to be applied to the display panel during the refresh frame, and thus, a grayscale response delay phenomenon occurring at a time Tt at which the anode reset frame is changed to the refresh frame can be more effectively reduced.

Moreover, the first global weight can be further adjusted by pixel row units based on a line weight further proportional to a distance between a pixel row and output terminals of the data driver, and thus, a grayscale response delay phenomenon occurring at a time Tt at which the anode reset frame is changed to the refresh frame can be more effectively reduced.

FIG. 16 is a table illustrating a detailed example where weights reflected in a data voltage of an input gray level are differently set based on a refresh rate to adjust a level of a flicker compensation data voltage.

Referring to FIG. 16, a low refresh rate mode can correspond to a refresh rate of less than 30 Hz, a middle refresh rate mode can correspond to a refresh rate of 30 Hz to less than 60 Hz, and a high refresh rate mode can correspond to a refresh rate of 60 Hz to less than 120 Hz.

In FIG. 16, a situation where an anode reset frame of a black gray level is changed to or transitions to a refresh frame of a white gray level can be expressed as gray rising or a gray rising type of situation, and a situation where an anode reset frame of the white gray level is changed to or transitions to a refresh frame of the black gray level can be expressed as gray falling or a gray falling type of situation.

In FIG. 16, an output can be a flicker compensation data voltage, and an input can be a target data voltage of the refresh frame. The target data voltage can be a data voltage of the white gray level in gray rising and can be a data voltage of the black gray level in gray falling. In FIG. 16, a digit multiplied by, added to, or subtracted from an input can represent a rising weight or a falling weight.

In the low refresh rate mode, a flicker compensation data voltage in gray rising can be "(data voltage of white gray level*1.3)+10," and a flicker compensation data voltage in gray falling can be "(data voltage of black gray level*0.9)−5."

In the middle refresh rate mode, a flicker compensation data voltage in gray rising can be "(data voltage of white gray level*1.2)+7," and a flicker compensation data voltage in gray falling can be "(data voltage of black gray level*0.95)−3."

In the high refresh rate mode, a flicker compensation data voltage in gray rising can be "(data voltage of white gray level*1.1)+5," and a flicker compensation data voltage in gray falling can be "(data voltage of black gray level*1.0)−1."

As described above, a flicker compensation data voltage in gray rising can be the highest in the low refresh rate mode, can be second highest in the middle refresh rate mode, and can be the lowest in the high refresh rate mode. Also, a flicker compensation data voltage in gray falling can be lowest in the low refresh rate mode, can be second lowest in the middle refresh rate mode, and can be highest in the high refresh rate mode.

An arithmetic operation of generating the flicker compensation data voltage described above can be performed in a digital mode by the timing controller 11.

Figure 17:
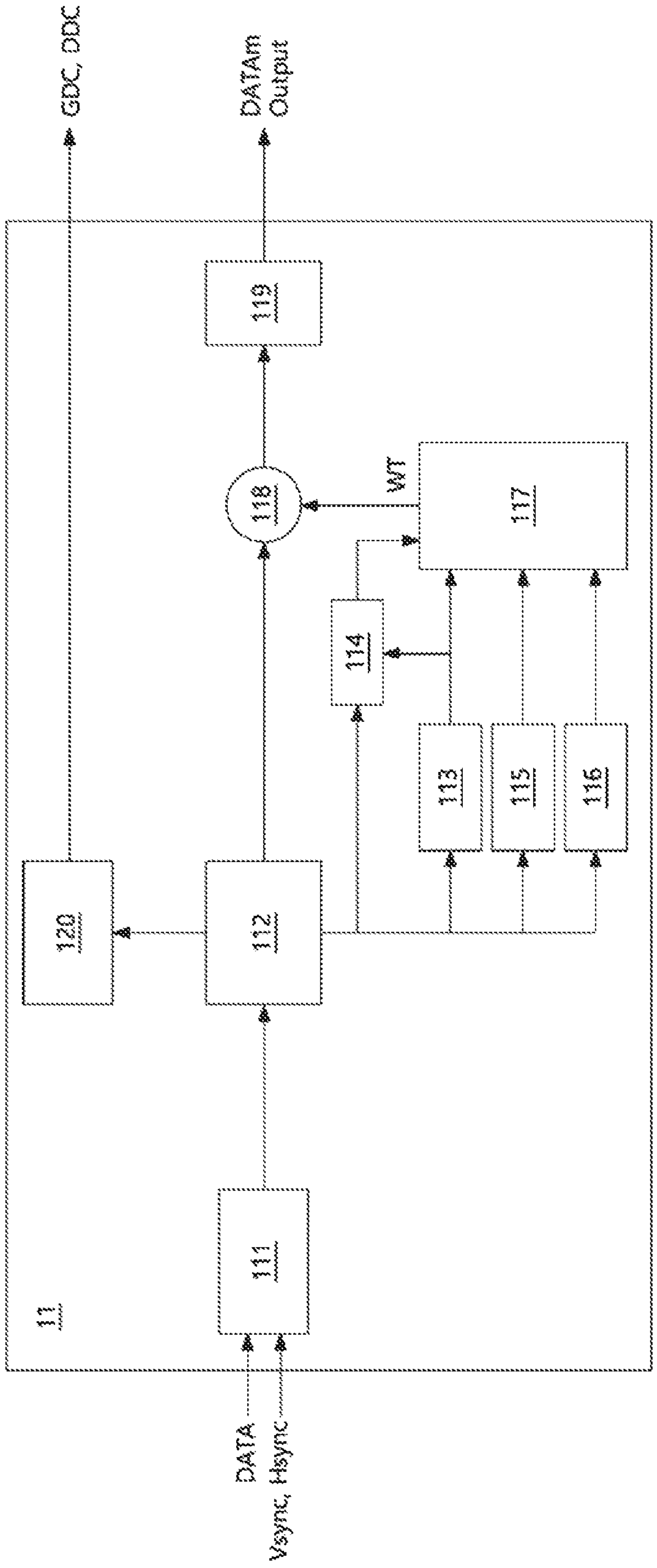
FIG. 17 is a diagram illustrating a configuration of a timing controller for a weight-based data modulation operation according to an embodiment of the present disclosure.

FIG. 17 is a diagram illustrating a configuration of a timing controller 11 for a data adjustment operation of FIG. 16.

Referring to FIG. 17, the timing controller 11 can include a data receiver 111, a refresh rate setting unit 112 (e.g., refresh rate setting circuit), a refresh frame buffer 113, a data transition extractor 114, an anode reset frame counter 115, a pixel row position extractor 116, a weight generator 117, a data modulator 118, a data transferor 119, and a control signal generator 120.

The data receiver 111 can be connected to the host system through an internal interface and can receive video data DATA and timing signals DE, Vsync, and Hsync from the host system. Also, the data receiver 111 can receive refresh rate variation information from the host system.

The refresh rate setting unit 112 can adjust the number of anode reset frames disposed between adjacent refresh frames based on the refresh rate variation information to vary a refresh period of the digital video data DATA. As a refresh rate is lowered or becomes slower, the number of anode reset frames disposed between adjacent refresh frames can be increased, and a data refresh period can become longer.

The refresh frame buffer 113 can store image data (previous frame data) of one screen at every refresh frame.

The data transition extractor 114 can calculate an average transition amount of image data (current frame data) of one screen which is to be applied to the display panel during the refresh frame. The data transition extractor 114 can compare current frame data with previous frame data stored in the refresh frame buffer 113 to calculate an average transition amount of the current frame data.

The anode reset frame counter 115 can count the number of anode reset frames based on a refresh rate.

The pixel row position extractor 116 can analyze a position of a pixel row to which corresponding image data is applied in the current frame data, and thus, can extract a pixel row position of the image data.

The weight generator 117 can generate, by screen units, a weight corresponding to the current frame data based on the number of anode reset frames. The weight can increase as the number of anode reset frames increases.

The weight generator 117 can further adjust the generated weight by screen units, based on a global weight proportional to an average transition amount of the current frame data. The global weight can increase as the average transition amount of the current frame data increases. The weight generator 117 can further adjust the generated weight by pixel row units, based on a line weight based on a pixel row position of image data. The line weight can increase as the pixel row position of the image data is located farther away from the data driver (e.g., to compensate for a voltage drop due to a long wire length).

The data modulator 118 can reflect the weight, generated by the weight generator 117, in the current frame data to modulate the current frame data.

The data transferor 119 can transfer modulated current frame data DATAm to the data driver based on the refresh frame.

The control signal generator 120 can generate and output control signals DDC and GDC for controlling an operation timing of the data driver and an operation timing of the gate driver based on the timing signals DE, Vsync, and Hsync.

Figure 18:
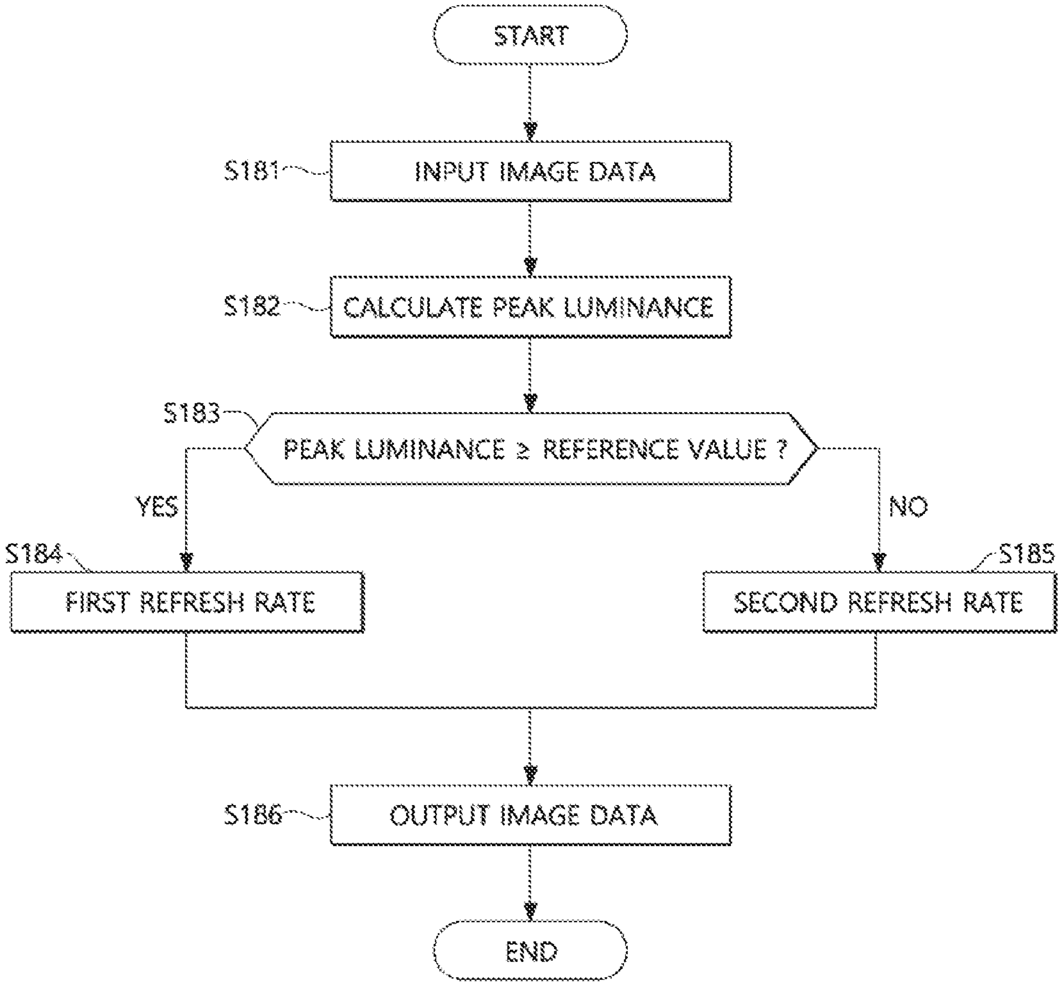
FIG. 18 is a flowchart illustrating an example where a data refresh period varies based on a peak luminance of a whole image.
Figure 19A:
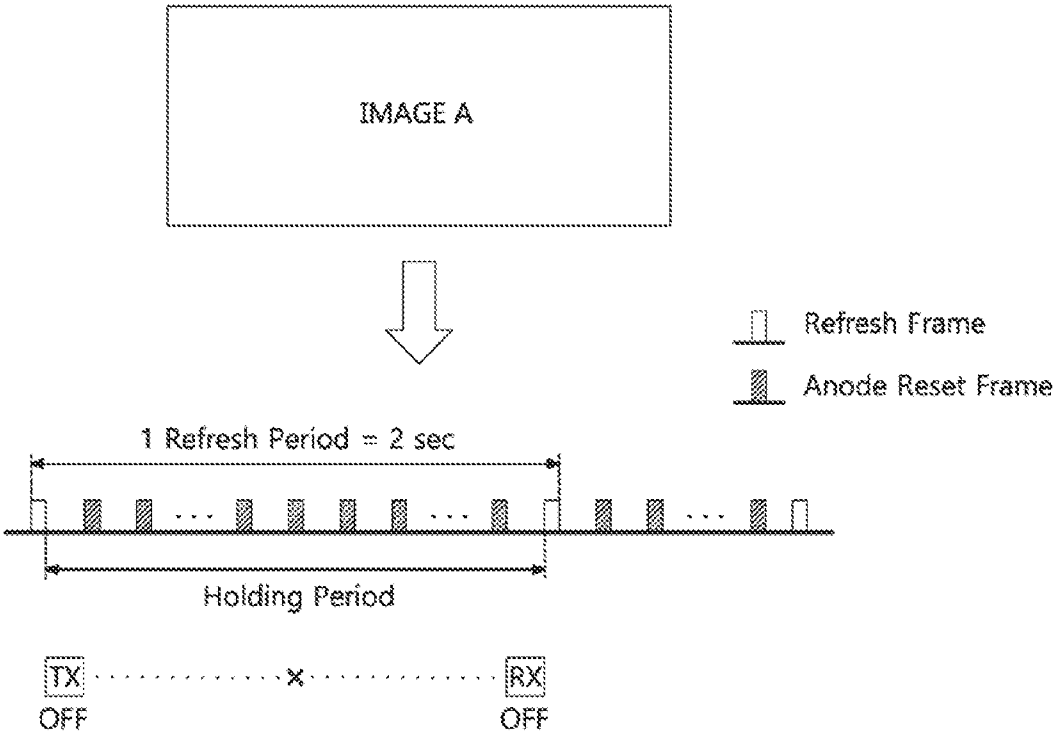
FIGS. 19A and 19B are diagrams illustrating an example where a temporal length of a holding period arranged between adjacent refresh frames varies based on a peak luminance of a whole image.
Figure 19B:
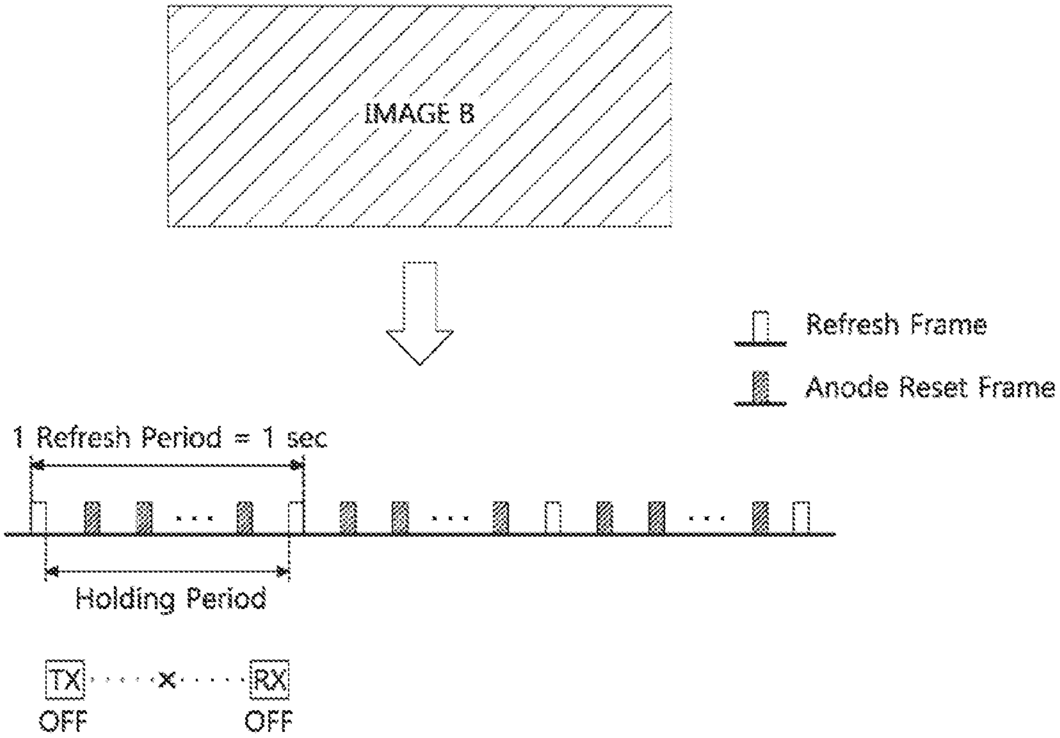
Figure 20A:
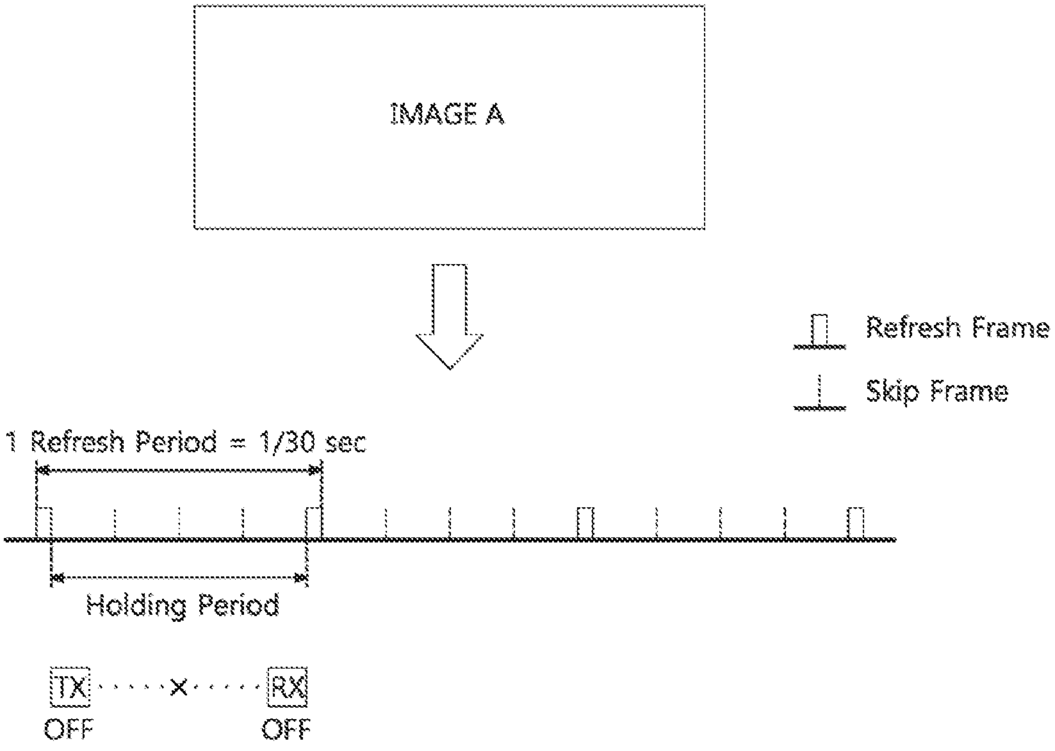
FIGS. 20A and 20B are flowcharts illustrating another example where a temporal length of a holding period arranged between adjacent refresh frames varies based on a peak luminance of a whole image.
Figure 20B:
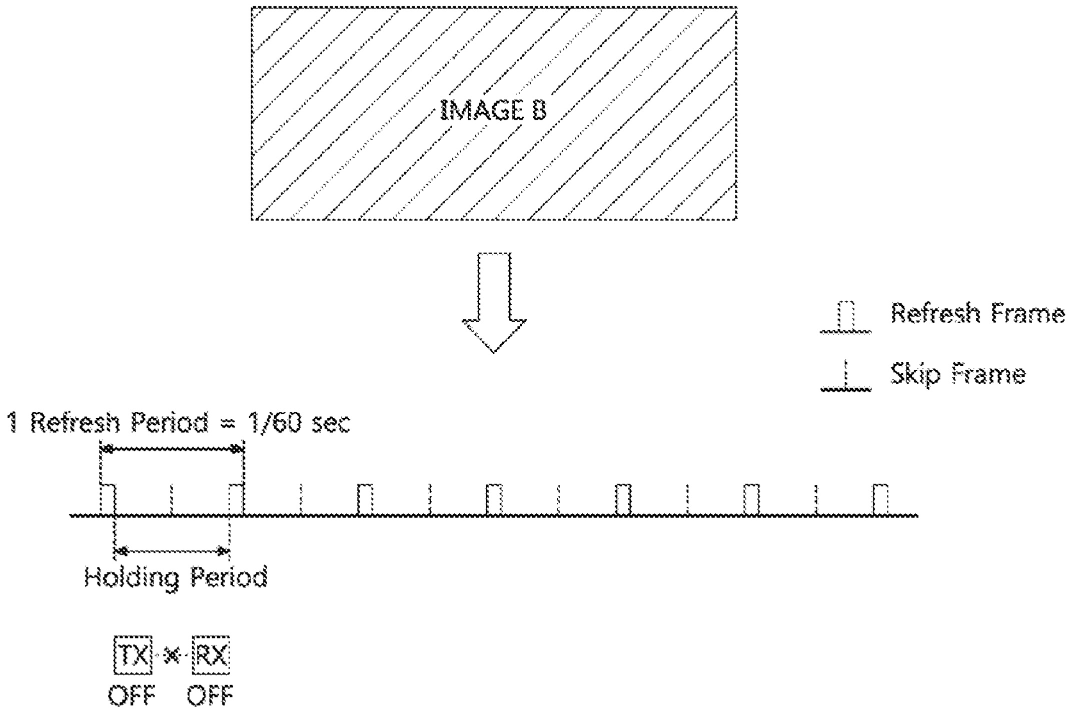

FIG. 18 is a flowchart illustrating an example where a data refresh period varies based on a peak luminance of a whole image. FIGS. 19A and 19B are diagrams illustrating an example where a temporal length of a holding period arranged between adjacent refresh frames varies based on a peak luminance of a whole image. FIGS. 20A and 20B are flowcharts illustrating another example where a temporal length of a holding period arranged between adjacent refresh frames varies based on a peak luminance of a whole image.

As illustrated in FIG. 18, when image data of one frame is input, a timing controller according to the present embodiment can calculate a peak luminance of the image data (S181 and S182). The peak luminance can be a luminance value of image data, having highest luminance, of the image data of one frame.

The timing controller can adjust a refresh rate at which the image data of one frame is to be displayed, based on the calculated peak luminance (S183). Because eyes of a user more easily perceive flickers in a dark image than a bright image, the timing controller can increase a refresh rate in the dark image (i.e., peak luminance<reference value) to improve flickers (S185). Also, the timing controller can reduce a refresh rate in the bright image (i.e., peak luminance≥reference value) to decrease power consumption (S184).

The timing controller can output image data to a data driver, based on the adjusted refresh rate (S186).

Referring to FIGS. 19A to 20B, a holding period of an image can vary based on an adjust refresh rate.

As in FIGS. 19A and 20A, when a bright image A is being displayed where a peak luminance of a whole image maintained in a display panel is greater than or equal to a reference value, a holding period between a first refresh frame and a second refresh frame can have a first temporal length. On the other hand, as in FIGS. 19B and 20B, when a dark image B is being displayed where the peak luminance of the whole image maintained in the display panel is less than the reference value, a holding period between a first refresh frame and a second refresh frame can have a second temporal length which is less than the first temporal length. As a temporal length of the holding period increases, the number of skip frames or anode reset frames included in the holding period may increase. During the holding period, the screen of the display panel is not updated with a new image.

The timing controller and the data driver can transfer image data therebetween through an interface circuit. The interface circuit can include a TX circuit included in the timing controller and an RX circuit included in the data driver. The TX circuit can transfer first image data, corresponding to a data voltage having a first gray level, to the RX circuit in the first refresh frame and can transfer second image data, corresponding to a data voltage having a second gray level, to the RX circuit in the second refresh frame.

As in FIGS. 19A to 20B, because the interface circuit is turned off during the holding period, an effect of reducing power consumption can more increase in the bright image A where the holding period is relatively long. Also, in the dark image B, because the interface circuit is turned off during the holding period, power consumption can be reduced.

Figure 21:
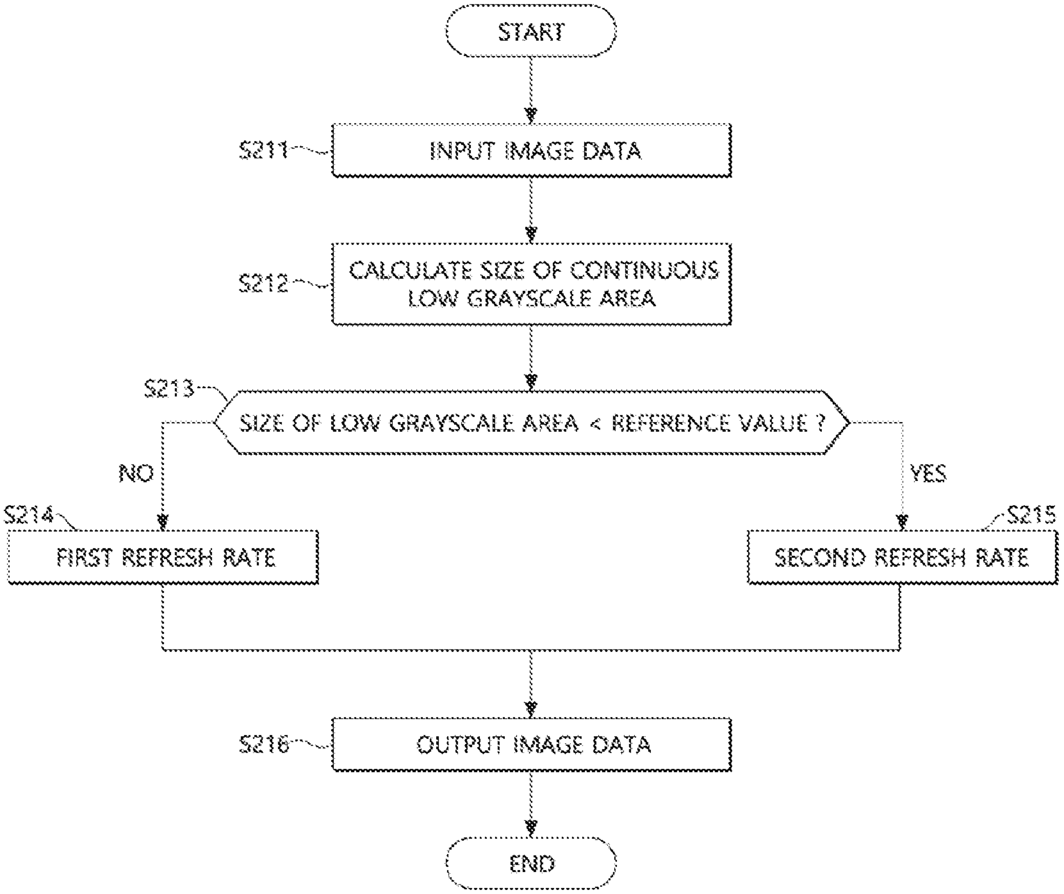
FIG. 21 is a flowchart illustrating an example where a data refresh period varies based on a size of a continuous low grayscale area in a whole area.

FIG. 21 is a flowchart illustrating an example where a data refresh period varies based on a size of a continuous low grayscale area in a whole area.

As in FIG. 21, when image data of one frame is input, the timing controller according to the present embodiment can calculate a size of the continuous low grayscale area in the image data (S211 and S212). The continuous low grayscale area may denote an area which is less than or equal to predetermined brightness (for example, a black gray level).

The timing controller can adjust a refresh rate at which the image data of one frame is to be displayed, based on the calculated size of the low grayscale area (S213). Because eyes of a user more easily perceive flickers in a dark image than a bright image, the timing controller can increase a refresh rate in the dark image (i.e., size of low grayscale area<reference value) to improve flickers (S215). Also, the timing controller can reduce a refresh rate in the bright image (i.e., size of low grayscale area≥reference value) to decrease power consumption (S214).

The timing controller can output image data to the data driver, based on the adjusted refresh rate (S216).

As in FIGS. 19A and 20A, when a bright image A is being displayed where a size of a low grayscale area of a whole image maintained in a display panel is greater than or equal to a reference value, a holding period between a first refresh frame and a second refresh frame can have a first temporal length. On the other hand, as in FIGS. 19B and 20B, when a dark image B is being displayed where the size of the low grayscale area of the whole image maintained in the display panel is less than the reference value, a holding period between a first refresh frame and a second refresh frame can have a second temporal length which is less than the first temporal length. As a temporal length of the holding period increases, the number of skip frames or anode reset frames included in the holding period may increase. During the holding period, the screen of the display panel is not updated with a new image.

The timing controller and the data driver can transfer image data therebetween through an interface circuit. The interface circuit can include a TX circuit included in the timing controller and an RX circuit included in the data driver. The TX circuit can transfer first image data, corresponding to a data voltage having a first gray level, to the RX circuit in the first refresh frame and can transfer second image data, corresponding to a data voltage having a second gray level, to the RX circuit in the second refresh frame.

As in FIGS. 19A to 20B, because the interface circuit is turned off during the holding period, an effect of reducing power consumption can more increase in the bright image A where the holding period is relatively long. Also, in the dark image B, because the interface circuit is turned off during the holding period, power consumption can be reduced.

Figure 22:
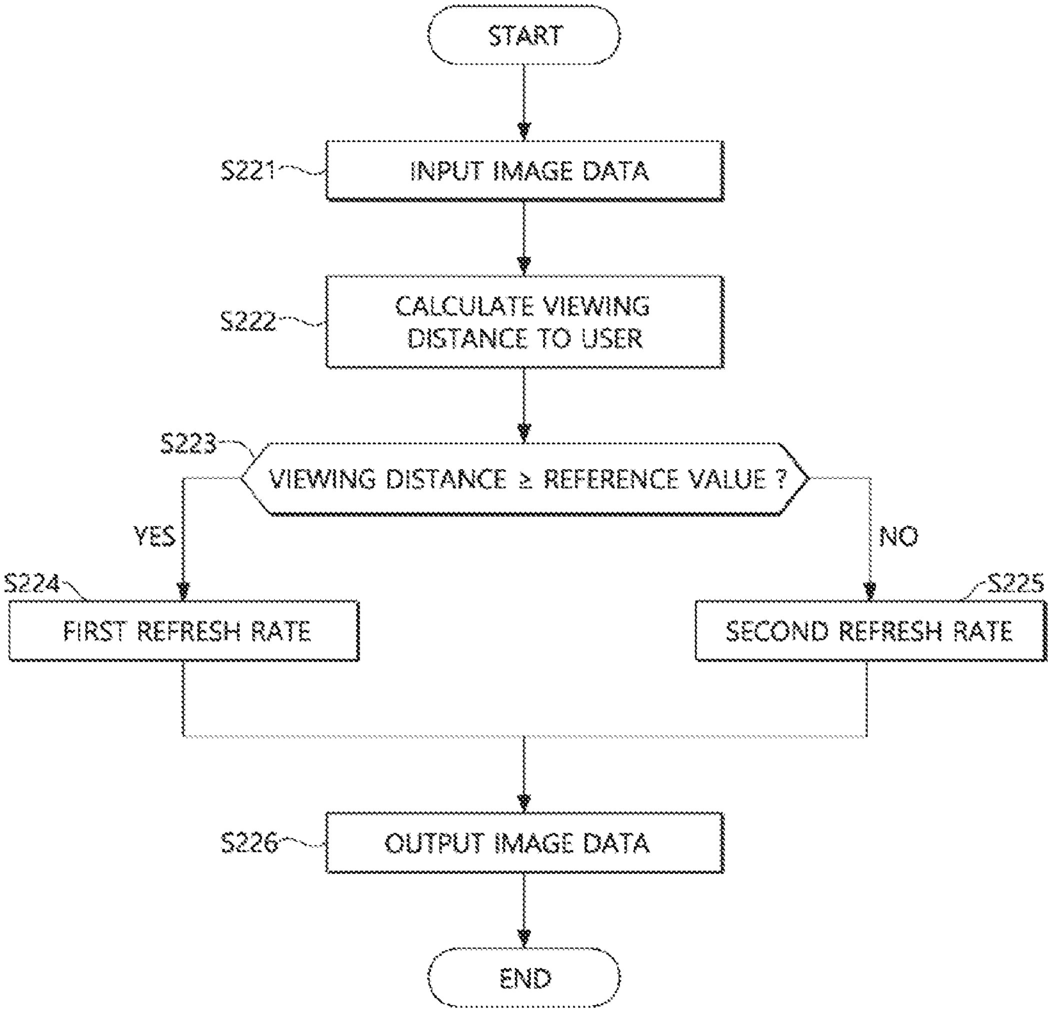
FIG. 22 is a flowchart illustrating an example where a data refresh period varies based on a viewing distance to a user watching a display panel.

FIG. 22 is a flowchart illustrating an example where a data refresh period varies based on a viewing distance to a user watching a display panel.

As in FIG. 22, when image data of one frame is input, a timing controller according to the present embodiment can calculate a viewing distance to a user watching a display panel, based on a user image obtained from a camera (S221 and S222). The camera can be previously installed in the display panel.

The timing controller can adjust a refresh rate at which image data of one frame is to be displayed, based on the calculated viewing distance to the user (S223). Because eyes of the user perceive flickers more easily in a case, where the user watches an image at a close position, than a case where the user watches an image at a remote position, the timing controller can increase a refresh rate at a close viewing distance (i.e., viewing distance<reference value) to improve flickers (S225). Also, the timing controller can reduce a refresh rate at a remote viewing distance (i.e., viewing distance≥reference value) to decrease power consumption (S224).

The timing controller can output image data to the data driver, based on the adjusted refresh rate (S226).

As in FIGS. 19A and 20A, when a viewing distance to a user watching an image A is greater than or equal to a reference value, a holding period between a first refresh frame and a second refresh frame can have a first temporal length. On the other hand, as in FIGS. 19B and 20B, when a viewing distance to a user watching an image B is less than the reference value, a holding period between a first refresh frame and a second refresh frame can have a second temporal length which is less than the first temporal length. As a temporal length of the holding period increases, the number of skip frames or anode reset frames included in the holding period may increase. During the holding period, the screen of the display panel is not updated with a new image.

The timing controller and the data driver can transfer image data therebetween through an interface circuit. The interface circuit can include a TX circuit included in the timing controller and an RX circuit included in the data driver. The TX circuit can transfer first image data, corresponding to a data voltage having a first gray level, to the RX circuit in the first refresh frame and can transfer second image data, corresponding to a data voltage having a second gray level, to the RX circuit in the second refresh frame.

As in FIGS. 19A to 20B, because the interface circuit is turned off during the holding period, an effect of reducing power consumption can more increase at a remote viewing distance which is relatively long. Also, because the interface circuit is turned off during the holding period at a close viewing distance, power consumption can be reduced.

The electroluminescent display apparatus according to the present disclosure can be based on the VRR technology where a data refresh period varies based on an attribute of an input image. The electroluminescent display apparatus according to the present disclosure can adjust a level of a flicker compensation data voltage based on a data refresh period to prevent flickers from occurring at a time at which a refresh rate varies in an anode reset frame, thereby increasing display quality.

The electroluminescent display apparatus according to the present disclosure may vary a data refresh period on the basis of a peak luminance of one screen, a size of a low grayscale area, or a viewing distance to a user to decrease flickers and may turn off an interface circuit between the timing controller and the data driver in a holding period between adjacent refresh frames, thereby reducing power consumption.

The effects according to the present disclosure are not limited to the above examples, and other various effects can be included in the specification.

While the present disclosure has been particularly shown and described with reference to exemplary embodiments thereof, it will be understood by those of ordinary skill in the art that various changes in form and details may be made therein without departing from the spirit and scope of the present disclosure as defined by the following claims.

What is claimed is:

1. An electroluminescent display apparatus comprising:
a display panel including at least one pixel; and
a data driver configured to:
output a data voltage of a first gray level to the at least one pixel in a first refresh frame,
output a flicker compensation data voltage to the at least one pixel in a second refresh frame, and
output an anode reset voltage to the at least one pixel in at least one anode reset frame arranged between the first refresh frame and the second refresh frame,
wherein the anode reset voltage is a voltage for turning off a light emitting device included in the at least one pixel,
wherein the flicker compensation data voltage is generated based on applying a weight to a data voltage of a second gray level,
wherein the flicker compensation data voltage is generated based on a first weight when a number of anode reset frames between the first refresh frame and the second refresh frame is N, and
wherein the flicker compensation data voltage is generated based on a second weight different than the first weight when the number of anode reset frames between the first refresh frame and the second refresh frame is M, where N is a natural number and M is a natural number greater than N.

2. The electroluminescent display apparatus of claim 1, wherein when the number of anode reset frames between the first refresh frame and the second refresh frame is N, the flicker compensation data voltage is different than when the number of anode reset frames between the first refresh frame and the second refresh frame is M.

3. The electroluminescent display apparatus of claim 1, wherein the anode reset voltage is supplied during a partial period of the anode reset frame.

4. The electroluminescent display apparatus of claim 1, wherein, when the data voltage of the second gray level is higher than the data voltage of the first gray level,
the flicker compensation data voltage is higher than the data voltage of the second gray level, and
the first weight and the second weight correspond to a first rising weight and a second rising weight, respectively.

5. The electroluminescent display apparatus of claim 4, wherein the second rising weight is greater than the first rising weight.

6. The electroluminescent display apparatus of claim 5, wherein a level of the first rising weight and a level of the second rising weight are adjusted based on a global weight proportional to an average transition amount of data voltages of one screen which are to be supplied to the display panel in the second refresh frame.

7. The electroluminescent display apparatus of claim 5, wherein a level of the first rising weight and a level of the second rising weight are adjusted based on a line weight proportional to a distance between a pixel row including the at least one pixel and output terminals of the data driver.

8. The electroluminescent display apparatus of claim 1, wherein, when the data voltage of the second gray level is lower than the data voltage of the first gray level,
the flicker compensation data voltage is lower than the data voltage of the second gray level, and
the first weight and the second weight correspond to a first falling weight and a second falling weight, respectively.

9. The electroluminescent display apparatus of claim 8, wherein the second falling weight is less than the first falling weight.

10. The electroluminescent display apparatus of claim 9, wherein a level of the first falling weight and a level of the second falling weight are adjusted based on a global weight proportional to an average transition amount of data voltages of one screen which are to be supplied to the display panel in the second refresh frame.

11. The electroluminescent display apparatus of claim 9, wherein a level of the first falling weight and a level of the second falling weight are adjusted based on a line weight proportional to a distance between a pixel row including the at least one pixel and output terminals of the data driver.

12. A data driver, configured to:
output a data voltage of a first gray level to at least one pixel in a first refresh frame,
output a flicker compensation data voltage to the at least one pixel in a second refresh frame, and
output an anode reset voltage to the at least one pixel in at least one anode reset frame arranged between the first refresh frame and the second refresh frame,
wherein the anode reset voltage is a voltage for turning off a light emitting device included in the at least one pixel,
wherein the flicker compensation data voltage is generated based on applying a weight to a data voltage of a second gray level,
wherein the flicker compensation data voltage is generated based on a first weight when a number of anode reset frames between the first refresh frame and the second refresh frame is N, and
wherein the flicker compensation data voltage is generated based on a second weight different than the first weight when the number of anode reset frames between the first refresh frame and the second refresh frame is M, where N is a natural number and M is a natural number greater than N.

13. The data driver of claim 12, wherein the anode reset voltage is supplied during a partial period of the anode reset frame, and
wherein when the number of anode reset frames between the first refresh frame and the second refresh frame is N, the flicker compensation data voltage is different than when the number of anode reset frames between the first refresh frame and the second refresh frame is M.

14. The data driver of claim 12, wherein, when the data voltage of the second gray level is higher than the data voltage of the first gray level, the flicker compensation data voltage is higher than the data voltage of the second gray level, and the first weight and the second weigh correspond to a first rising weight and a second rising weight, respectively.

15. The data driver of claim 14, wherein the second rising weight is greater than the first rising weight.

16. The data driver of claim 12, wherein, when the data voltage of the second gray level is lower than the data voltage of the first gray level, the flicker compensation data voltage is lower than the data voltage of the second gray level, and the first weight and the second weight correspond to a first falling weight and a second falling weight, respectively.

17. The data driver of claim 16, wherein the second falling weight is less than the first falling weight.

18. A method of driving an electroluminescent display apparatus, the method comprising:

outputting a data voltage of a first gray level to a pixel of a display panel in a first refresh frame;

outputting a flicker compensation data voltage to the pixel in a second refresh frame; and outputting an anode reset voltage to the pixel in one or more anode reset frames arranged between the first refresh frame and the second refresh frame, wherein the anode reset voltage is a voltage for turning off a light emitting device included in the pixel, wherein the flicker compensation data voltage is generated based on applying a weight to a data voltage of a second gray level, wherein the flicker compensation data voltage is generated based on a first weight when a number of anode reset frames between the first refresh frame and the second refresh frame is N, and wherein the flicker compensation data voltage is generated based on a second weight different than the first weight when the number of anode reset frames between the first refresh frame and the second refresh frame is M, where N is a natural number and M is a natural number greater than N.

19. The method of claim 18, wherein the first refresh frame and the second refresh frame are supplied based on a set refresh rate, and a number of the one or more anode reset frames arranged between the first refresh frame and the second refresh frame increases as a period of the refresh rate is made longer.

20. The electroluminescent display apparatus of claim 1, wherein, when a peak luminance of a whole image maintained in the display panel is greater than or equal to a reference value, a holding period between the first refresh frame and the second refresh frame has a first temporal length, and when the peak luminance of the whole image is less than the reference value, the holding period between the first refresh frame and the second refresh frame has a second temporal length which is less than the first temporal length.

21. The electroluminescent display apparatus of claim 1, wherein, when a size of a low grayscale area, which is less than or equal to predetermined brightness, of a whole image maintained in the display panel is greater than or equal to a reference value, a holding period between the first refresh frame and the second refresh frame has a first temporal length, and when the size of the low grayscale area is less than the reference value, the holding period between the first refresh frame and the second refresh frame has a second temporal length which is less than the first temporal length.

22. The electroluminescent display apparatus of claim 1, wherein, when a viewing distance to a user watching the display panel is greater than or equal to a reference value, a holding period between the first refresh frame and the second refresh frame has a first temporal length, and when the viewing distance to the user is less than the reference value, the holding period between the first refresh frame and the second refresh frame has a second temporal length which is less than the first temporal length.

23. The electroluminescent display apparatus of claim 20, further comprising an interface circuit configured to transfer first image data, corresponding to a data voltage having the first gray level in the first refresh frame, between a timing controller and the data driver and transfer second image data, corresponding to a data voltage having the second gray level in the second refresh frame, between the timing controller and the data driver, and the interface circuit is turned off during the holding period.

24. The electroluminescent display apparatus of claim 21, further comprising an interface circuit configured to transfer first image data, corresponding to a data voltage having the first gray level in the first refresh frame, between a timing controller and the data driver and transfer second image data, corresponding to a data voltage having the second gray level in the second refresh frame, between the timing controller and the data driver, and the interface circuit is turned off during the holding period.

25. The electroluminescent display apparatus of claim 22, further comprising an interface circuit configured to transfer first image data, corresponding to a data voltage having the first gray level in the first refresh frame, between a timing controller and the data driver and transfer second image data, corresponding to a data voltage having the second gray level in the second refresh frame, between the timing controller and the data driver, and the interface circuit is turned off during the holding period.

* * * * *